US012673261B2

(12) United States Patent
Yang

(10) Patent No.: US 12,673,261 B2
(45) Date of Patent: Jul. 7, 2026

(54) PERSPECTIVE ROTATION METHOD AND APPARATUS, DEVICE, AND STORAGE MEDIUM

(71) Applicant: Tencent Technology (Shenzhen) Company Limited, Shenzhen (CN)

(72) Inventor: Jin Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 141 days.

(21) Appl. No.: 18/387,787

(22) Filed: Nov. 7, 2023

(65) Prior Publication Data

US 2024/0066404 A1 Feb. 29, 2024

Related U.S. Application Data

(63) Continuation of application No. 17/227,129, filed on Apr. 9, 2021, now Pat. No. 11,845,007, which is a
(Continued)

(30) Foreign Application Priority Data

Jan. 24, 2019 (CN) .......................... 201910069753.0

(51) Int. Cl.
*A63F 13/5255* (2014.01)
*A63F 13/2145* (2014.01)
(Continued)

(52) U.S. Cl.
CPC ...... *A63F 13/5255* (2014.09); *A63F 13/2145* (2014.09); *A63F 13/55* (2014.09); *A63F 13/837* (2014.09); *A63F 2300/8082* (2013.01)

(58) Field of Classification Search
CPC .. A63F 13/5255; A63F 13/2145; A63F 13/55; A63F 13/837; A63F 2300/8082; A63F 13/211; A63F 13/22; A63F 13/822
See application file for complete search history.

(56) References Cited

U.S. PATENT DOCUMENTS

2002/0054018 A1* 5/2002 Yamaguchi ......... A63F 13/5255
345/157
2008/0129688 A1* 6/2008 Richardson ......... G06F 3/04815
345/156
(Continued)

FOREIGN PATENT DOCUMENTS

CN 107050861 A 8/2017
CN 108415639 A 8/2018
(Continued)

OTHER PUBLICATIONS

Gameranx.com, "Red Dead Redemption 2: Struggling With The Controls? Try Changing These Settings", Online, Oct. 30, 2018, Retrieved from the Internet: https://gameranx.com/features/id/164441/article/red-dead redemption-2-struggling-with-the-controls-try-changing-these-settings.
(Continued)

*Primary Examiner* — Carl V Larsen
(74) *Attorney, Agent, or Firm* — Morgan, Lewis & Bockius LLP

(57) ABSTRACT

This application discloses a perspective rotation method in a virtual environment associated with a virtual player of an application performed by a terminal. The method includes: displaying a first perspective picture of the application observed in a first observation direction of the virtual player in the virtual environment; receiving a perspective rotation operation by a user of the terminal; determining a range within which a speed of the perspective rotation operation falls; and; and rotating from the first perspective picture to
(Continued)

a third perspective picture observed in a third observation direction of the virtual player in the virtual environment, a second angular difference between the third observation direction and the first observation direction being proportional to an angular velocity corresponding to the range of the speed of the perspective rotation operation.

12 Claims, 12 Drawing Sheets

Related U.S. Application Data continuation of application No. PCT/CN2020/072793, filed on Jan. 17, 2020.

(51) Int. Cl.
  *A63F 13/55* (2014.01)
  *A63F 13/837* (2014.01)

(56) References Cited

U.S. PATENT DOCUMENTS

| | | | | |
|---|---|---|---|---|
| 2010/0069152 | A1 | 3/2010 | Nishimura et al. | |
| 2010/0279770 | A1* | 11/2010 | Ikeda | A63F 13/211 |
| | | | | 463/32 |
| 2011/0010659 | A1 | 1/2011 | Kim et al. | |
| 2011/0032199 | A1* | 2/2011 | Seo | G06F 3/0418 |
| | | | | 345/173 |
| 2012/0001944 | A1* | 1/2012 | Sakurai | G06F 3/04815 |
| | | | | 345/671 |
| 2014/0066200 | A1* | 3/2014 | Matsui | A63F 13/2145 |
| | | | | 463/31 |
| 2015/0363965 | A1 | 12/2015 | Wells et al. | |
| 2016/0202665 | A1 | 7/2016 | Park | |
| 2017/0178404 | A1* | 6/2017 | Dillard | G06F 3/04886 |
| 2017/0291103 | A1 | 10/2017 | Koizumi et al. | |
| 2018/0364815 | A1 | 12/2018 | Moussette et al. | |
| 2019/0068945 | A1* | 2/2019 | Maruyama | A63F 13/5255 |
| 2020/0078667 | A1* | 3/2020 | Nelson | G06F 3/04883 |
| 2020/0108308 | A1* | 4/2020 | Shinoda | A63F 13/26 |
| 2020/0285370 | A1 | 9/2020 | Hao et al. | |
| 2020/0387280 | A1* | 12/2020 | Mochizuki | G06F 3/011 |
| 2021/0220738 | A1 | 7/2021 | Yang | |

FOREIGN PATENT DOCUMENTS

| | | |
|---|---|---|
| CN | 108499105 A | 9/2018 |
| CN | 109821237 A | 5/2019 |
| JP | 2007135823 A | 6/2007 |
| JP | 2014045966 A | 3/2014 |

OTHER PUBLICATIONS

Tencent Technology, ISRWO, PCT/CN2020/072793, 20APR2020, 8 pgs.

Tencent Technology, IPRP, PCT/CN2020/072793, 27JUL2021, 7 pgs.

Tencent Technology, Korean Office Action, KR Patent Application No. 10-2021-7013530, Dec. 19, 2022, 18 pgs.

Tencent Technology, Singapore Office Action, SG Patent Application No. 11202104917R, Aug. 25, 2022, 11 pgs.

* cited by examiner

PERSPECTIVE ROTATION METHOD AND APPARATUS, DEVICE, AND STORAGE MEDIUM

CROSS-REFERENCE TO RELATED APPLICATIONS

This application is a continuation application of U.S. patent application Ser. No. 17/227,129, entitled "PERSPEC-TIVE ROTATION METHOD AND APPARATUS, DEVICE, AND STORAGE MEDIUM" filed on Apr. 9, 2021, which is a continuation application of PCT Patent Application No. PCT/CN2020/072793, entitled "PER-SPECTIVE ROTATION METHOD AND APPARATUS, DEVICE, AND STORAGE MEDIUM" filed on Jan. 17, 2020, which claims priority to Chinese Patent Application No. 201910069753.0, filed on Jan. 24, 2019 and entitled "PERSPECTIVE ROTATION METHOD AND APPARA-TUS, DEVICE, AND STORAGE MEDIUM", all of which are incorporated herein by reference in their entirety.

FIELD OF THE TECHNOLOGY

Embodiments of this application relate to the field of man-machine interaction, and in particular, to a perspective rotation method and apparatus, a device, and a storage medium.

BACKGROUND OF THE DISCLOSURE

There are a lot of applications based on virtual environments on a terminal such as a smartphone or a tablet computer.

In the application, a user observes a surrounding environment and aims and shoots by controlling a perspective of a virtual role to rotate. Therefore, when operating in the application, the user needs to continually rotate the perspective. Generally, through an upward, downward, leftward, or rightward movement operation triggered on a screen, the user controls the perspective of the virtual role in the application to rotate upward, downward, leftward, or rightward.

In the application, an angular velocity of the perspective rotation of the virtual role is usually a fixed value, and the fixed angular velocity is relatively small. Therefore, when the user needs to rotate the perspective of the virtual role by a large angle, the rotation cannot be implemented by only one perspective rotation operation, but needs to be implemented through two or more perspective rotation operations. However, in the process of operating the application, in addition to the perspective rotation operations, the user also needs to perform control operations, for example, triggering the virtual role to move forward or switch weapons. Consequently, frequent perspective rotations affect the overall operation efficiency of the user.

SUMMARY

The embodiments of this application provide a perspective rotation method and apparatus, a device, and a storage medium. When a perspective rotation accelerating condition is met, a large-angle rotation may be realized by increasing a rotation angular velocity, so that a user does not need to perform frequent operations in a process of adjusting an observation angle, and the operation efficiency is improved. The technical solutions are as follows:

According to one aspect of this application, a perspective rotation method is performed by a terminal in a virtual environment associated with an application. The method includes:

displaying a first perspective picture of the application in the virtual environment, the first perspective picture being a picture of the virtual environment that is observed from a first perspective of a virtual player of the application in a first observation direction, and the first perspective picture being further provided with a perspective rotation control;

receiving a perspective rotation operation triggered on the perspective rotation control by a user of the terminal;

displaying a second perspective picture of the application in the virtual environment in response to that the perspective rotation operation does not meet a perspective rotation accelerating condition, the second perspective picture being a picture of the virtual environment that is observed from a second perspective of the virtual player in a second observation direction, the second observation direction being obtained through rotation according to a first angular velocity from the first observation direction; and displaying a third perspective picture of the application in the virtual environment in response to that the perspective rotation operation meets the perspective rotation accelerating condition, the third perspective picture being a picture of the virtual environment that is observed from a third perspective of the virtual player in a third observation direction, the third observation direction being obtained through rotation according to a second angular velocity from the first observation direction;

the first angular velocity being less than the second angular velocity.

According to another aspect of this application, a terminal is provided. The terminal includes a processor and a memory, the memory storing computer-readable instructions that, when executed by the processor of the terminal, cause the terminal to perform the perspective rotation method according to any one of the foregoing one aspect of this application and the illustrative embodiments thereof or the perspective rotation method according to any one of the foregoing another aspect of this application and the illustrative embodiments thereof.

According to another aspect of this application, a non-transitory computer-readable storage medium is provided. The non-transitory computer-readable storage medium stores computer-readable instructions that, when executed by a processor of a terminal, cause the terminal to perform the perspective rotation method according to any one of the foregoing one aspect of this application and the illustrative embodiments thereof or the perspective rotation method according to any one of the foregoing another aspect of this application and the illustrative embodiments thereof.

The technical solutions provided in the embodiments of this application bring at least the following beneficial effects:

A first perspective picture of an application is displayed; a perspective rotation operation triggered on a perspective rotation control provided on the first perspective picture is received, the first perspective picture being a picture of a virtual environment that is observed from a first perspective in a first observation direction; a second perspective picture of the application is displayed in response to that the perspective rotation operation does not meet a perspective rotation accelerating condition, the second perspective picture being a picture of the virtual environment that is observed from a second perspective of the virtual player in a second observation direction, the second observation direction being obtained through rotation according to a first angular velocity by using the first observation direction as a reference; and a third perspective picture of the application is displayed in response to that the perspective rotation operation meets the perspective rotation accelerating condition, the third perspective picture being a picture of the virtual environment that is observed from a third perspective of the virtual player in a third observation direction, the third observation direction being obtained through rotation according to a second angular velocity by using the first observation direction as a reference, and the first angular velocity being less than the second angular velocity. Therefore, in a large-angle perspective rotation scenario, when the perspective rotation accelerating condition is met, a large-angle rotation can be rapidly implemented by using the larger second angular velocity, so that frequent perspective rotations are not needed in a process of operating the application, and user operation efficiency is improved.

BRIEF DESCRIPTION OF THE DRAWINGS

To describe the technical solutions in the embodiments of this application more clearly, the accompanying drawings required for describing the embodiments are briefly described hereinafter. Apparently, the accompanying drawings in the following description show merely some embodiments of this application, and a person of ordinary skill in the art may obtain other accompanying drawings according to these accompanying drawings without creative efforts.

DESCRIPTION OF EMBODIMENTS

Figure 1:
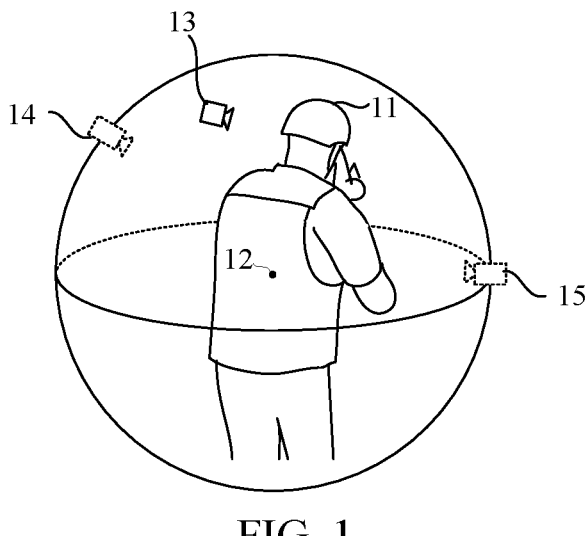
FIG. 1 is a schematic diagram of a camera model according to an exemplary embodiment of this application.

To make the objectives, technical solutions, and advantages of this application clearer, the following further describes implementations of this application in detail with reference to the accompanying drawings.

First, the following explains several terms involved in the embodiments of this application.

Virtual environment refers to a virtual environment displayed (or provided) when an application runs on a terminal. The virtual environment may be a simulated environment of a real world, or may be a semi-simulated semi-fictional three-dimensional (3D) environment, or may be an entirely fictional 3D environment. The virtual environment may be any one of a two-dimensional virtual environment, a 2.5-dimensional virtual environment, and a 3D virtual environment. Description is made by using an example in which the virtual environment is a 3D virtual environment in the following embodiment, but this is not limited.

Virtual role refers to a movable object in a virtual environment. The movable object may be at least one of a virtual character, a virtual animal, and a cartoon character. In some embodiments, when the virtual environment is a 3D virtual environment, the virtual role is a 3D model created based on a skeletal animation technology. Each virtual role has a respective shape and size in the 3D virtual environment, and occupies some space in the 3D virtual environment.

Perspective refers to an observation angle at which observation is performed in a virtual environment from a first-person perspective or a third-person perspective of a virtual role. In some embodiments, in the embodiments of this application, the perspective is an angle at which a virtual role is observed in a virtual environment by using a camera model (also known as "virtual camera"), and an observation direction is a direction pointed by a camera orientation of the camera model in the virtual environment.

In some embodiments, the camera model automatically follows the virtual role in the virtual environment. That is, when a position of the virtual role in the virtual environment changes, a position of the camera model following the virtual role in the virtual environment changes simultaneously, and the camera model is always within a preset distance range of the virtual role in the virtual environment. In some embodiments, in the process of automatically following the virtual role, relative positions of the camera model and the virtual role do not change.

Camera model refers to a 3D model located around a virtual role in a 3D virtual environment. When a first-person perspective is used, the camera model is located near the head of the virtual role or at the head of the virtual role. When a third-person perspective is used, the camera model may be located behind the virtual role and bound to the virtual role, or may be located at any position away from the virtual role by a preset distance. The virtual role located in the 3D virtual environment may be observed from different angles by using the camera model. In some embodiments, when the third-person perspective is a first-person over-shoulder perspective, the camera model is located behind the virtual role (for example, the head or the shoulders of a virtual character). In some embodiments, in addition to the first-person perspective and the third-person perspective, the perspective also includes other perspectives, such as a top perspective. When the top perspective is used, the camera model may be located above the head of the virtual role. The top perspective is a perspective for observing the virtual environment with an angle from the sky. In some embodiments, the camera model is not actually displayed in the 3D virtual environment. In other words, the camera model is not displayed in the 3D virtual environment displayed in a user interface (UI).

Description is made by using an example in which the camera model is located at any position away from the virtual role by a preset distance. In some embodiments, one virtual role corresponds to one camera model, and the camera model may rotate with the virtual role as a rotation center. For example, the camera model is rotated with any point of the virtual role as a rotation center. During rotation, the camera model is not only rotated at an angle, but also displaced. During rotation, a distance between the camera model and the rotation center remains unchanged, that is, the camera model is rotated on a surface of a sphere with the rotation center as a sphere center. Any point of the virtual role may be the head or the torso of the virtual role, or any point around the virtual role. This is not limited in the embodiments of this application. In some embodiments, when the virtual role is observed by using the camera model, the center direction of the perspective of the camera model is a direction in which a point of a spherical surface on which the camera model is located points to a sphere center.

In some embodiments, the virtual role may alternatively be observed by using the camera model at a preset angle in different directions of the virtual role.

For example, referring to FIG. 1, a point of a virtual role 11 is determined as a rotation center 12, and the camera model rotates around the rotation center 12. In some embodiments, an initial position is configured for the camera model, and the initial position is a position over the rear of the virtual role (for example, a position behind the head). For example, as shown in FIG. 1, the initial position is a position 13, and when the camera model rotates to a position 14 or a position 15, a direction of a perspective of the camera model changes as the camera model rotates.

A terminal in this application may be a laptop portable computer, a mobile phone, a tablet computer, an e-book reader, a video game console, a moving picture experts group audio layer IV (MP4) player, or the like.

Figure 2:
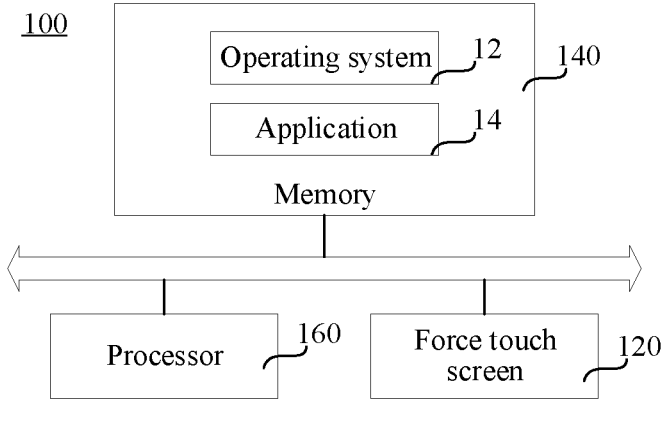
FIG. 2 is a structural block diagram of a terminal according to an exemplary embodiment of this application.

The terminal includes a force touch screen 120, a memory 140, and a processor 160. For a hardware structure, refer to a structural block diagram of a terminal in FIG. 2.

The force touch screen 120 may be a capacitive touch screen or a resistive touch screen. The force touch screen 120 is configured to implement interaction between the terminal and a user. In the embodiments of this application, the terminal obtains, by using the force touch screen 120, a movement distance or a movement linear velocity of a perspective rotation operation triggered by the user.

The memory 140 may include one or more computer-readable storage media. The computer storage medium includes at least one of a random access memory (RAM), a read-only memory (ROM), and a flash. An operating system 12 and an application 14 are installed in the memory 140.

The operating system 12 is basic software provided for the application 14 to perform secure access to computer hardware. The operating system may be an Android system or an iOS system.

The application 14 is an application supporting a virtual environment, and the virtual environment includes a virtual role. In some embodiments, the application 14 is an application supporting a 3D virtual environment. The application 14 may be any one of a virtual reality application, a 3D map program, a military simulation program, a TPS game, a first-person shooting (FPS) game, a multiplayer online battle arena (MOBA) game, and a multiplayer gunfight survival game. In some embodiments, the application 14 may be a standalone application, such as a standalone 3D game program, or may be an online application.

The processor 160 may include one or more processing cores, and may be for example, a 4-core processor or an 8-core processor. The processor 160 is configured to execute a perspective rotation command according to a perspective rotation operation received on the force touch screen 120.

Figure 3:
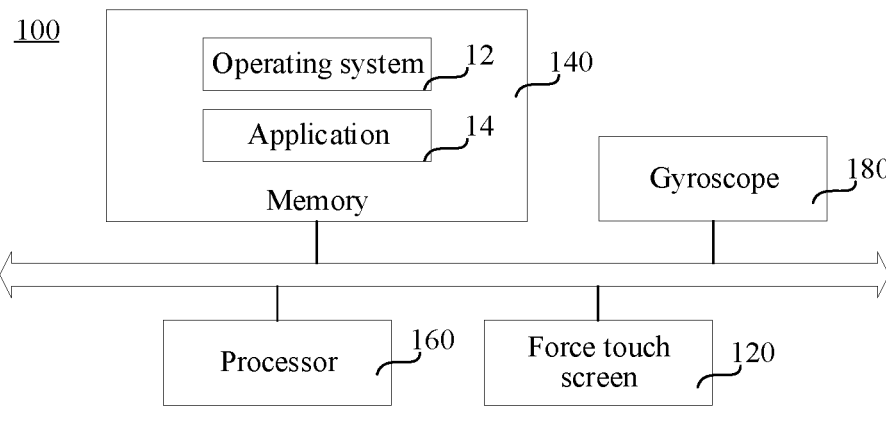
FIG. 3 is a structural block diagram of a terminal according to another exemplary embodiment of this application.

As shown in FIG. 3, in the embodiments of this application, the terminal may further include a gyroscope 180. The gyroscope 180 is configured to obtain a rotation angular velocity of the terminal, the rotation angular velocity being used for determining a perspective rotation angle of the virtual role in the virtual environment.

Figure 4:
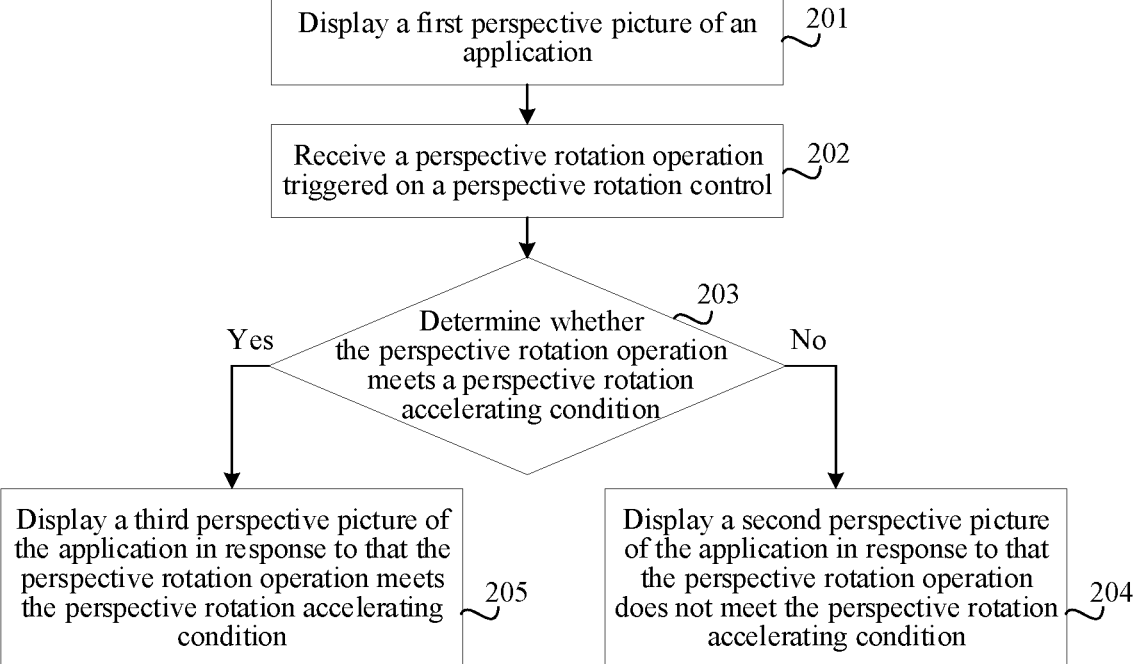
FIG. 4 is a flowchart of a perspective rotation method according to an exemplary embodiment of this application.

FIG. 4 is a flowchart of a perspective rotation method according to an exemplary embodiment of this application. The method is described by using an example in which the method is applicable to the terminal shown in FIG. 2 or FIG. 3. The method includes the following steps.

Step 201. Display a first perspective picture of an application in a virtual environment.

The terminal displays the first perspective picture of the application. In some embodiments, the application may be at least one of a virtual reality application, a 3D map application, a military simulation program, a TPS game, an FPS game, and an MOBA game.

In some embodiments, the first perspective picture is a picture of a virtual environment that is observed from a first perspective of a virtual player of the application in a first observation direction. The first perspective may be at least one of a first-person perspective, a third-person perspective, or other perspectives. The other perspectives may be a top perspective or any other possible perspectives. A virtual environment picture corresponding to the first-person perspective does not include a virtual role, and virtual environment pictures corresponding to the third-person perspective and the top perspective include virtual roles. For example, when the virtual environment is observed by using a camera model, a 3D model of the virtual role and a virtual gun held by the virtual role can be seen.

In some embodiments, the first perspective picture is further provided with a perspective rotation control. The perspective rotation control is configured to control a perspective of the virtual role to rotate.

Step 202. Receive a perspective rotation operation triggered on the perspective rotation control by a user of the terminal.

In some embodiments, an operation parameter of the perspective rotation operation includes at least one of a movement distance generated on a screen, a movement linear velocity generated on the screen, and a rotation angular velocity of the terminal.

The movement distance generated on the screen refers to a slide distance on the screen during a user operation. Schematically, the movement distance may be a linear distance between two points. The movement linear velocity generated on the screen refers to a slide speed on the screen during the user operation. Schematically, the movement linear velocity may be an average linear velocity during movement between the two points. The two points may include a touch point before the sliding and a touch point after the sliding. The rotation angular velocity of the terminal refers to an angular velocity generated when the terminal is rotated. Schematically, the rotation angular velocity may be an average angular velocity during the rotation. In some embodiments, the user operation may be a slide operation on a touch screen performed by the user.

In some embodiments, the terminal includes a touch screen. The user slides on the touch screen to trigger the perspective rotation operation, and an operation parameter is generated. The operation parameter is a movement distance or a movement linear velocity.

In some embodiments, the terminal includes a gyroscope. The user rotates the terminal and an operation parameter is generated. The operation parameter includes a rotation angular velocity of the terminal.

Step 203. Determine whether the perspective rotation operation meets a perspective rotation accelerating condition.

There are two methods for rotating a perspective of a virtual role in a virtual environment. A first method is to determine a perspective rotation angle according to a first angular velocity by using the first observation direction as a reference. A second method is to determine a perspective rotation angle according to a second angular velocity by using the first observation direction as a reference. When the perspective rotation operation received by the terminal does not meet the perspective rotation accelerating condition, the first perspective rotation method is determined to be used, that is, step 204 is performed; otherwise, the second perspective rotation method is determined to be used, that is, step 205 is performed.

In some exemplary embodiments, a distance threshold is preset in the terminal. By determining whether the movement distance generated on the screen is greater than the distance threshold, it is determined that the perspective rotation operation meets the perspective rotation accelerating condition in response to that the movement distance is greater than the distance threshold, and step 205 is performed; otherwise, it is determined that the perspective rotation operation does not meet the perspective rotation accelerating condition in response to that the movement distance is less than or equal to the distance threshold, and step 204 is performed. In some embodiments, the distance threshold may be a default threshold in the application or may be set by the user.

In some other exemplary embodiments, a linear velocity threshold is preset in the terminal. By determining whether the movement linear velocity generated on the screen is greater than the linear velocity threshold, it is determined that the perspective rotation operation meets the perspective rotation accelerating condition in response to that the movement linear velocity is greater than the linear velocity threshold, and step 205 is performed; otherwise, it is determined that the perspective rotation operation does not meet the perspective rotation accelerating condition in response to that the movement linear velocity is less than or equal to the linear velocity threshold, and step 204 is performed. In some embodiments, the linear velocity threshold may be a default threshold in the application or may be set by the user.

In some other exemplary embodiments, an angular velocity threshold is preset in the terminal. By determining whether the rotation angular velocity of the terminal is greater than the angular velocity threshold, it is determined that the perspective rotation operation meets the perspective rotation accelerating condition in response to that the rotation angular velocity is greater than the angular velocity threshold, and step 205 is performed; otherwise, it is determined that the perspective rotation operation does not meet the perspective rotation accelerating condition in response to that the rotation angular velocity is less than or equal to the angular velocity threshold, and step 204 is performed. In some embodiments, the angular velocity threshold may be a default threshold in the application or may be set by the user.

Step 204. Display a second perspective picture of the application in the virtual environment in response to that the perspective rotation operation does not meet the perspective rotation accelerating condition.

The second perspective picture is a picture of the virtual environment that is observed from a second perspective of the virtual player in a second observation direction, and the second observation direction is obtained through rotation according to a first angular velocity by using the first observation direction as a reference.

The terminal determines a perspective rotation direction according to an operation direction of the perspective rotation operation, determines the first angular velocity for perspective rotation according to the operation parameter of the perspective rotation operation, to determine a first angle for perspective rotation according to the first angular velocity of the perspective rotation operation, and performs rotation by the first angle according to the determined perspective rotation direction by using the first observation direction as a reference to obtain the second observation direction, so that the second perspective picture corresponding to the second observation direction is determined.

In some embodiments, the terminal determines the first angular velocity for perspective rotation according to the movement distance.

Alternatively, the terminal determines the first angular velocity for perspective rotation according to the movement linear velocity.

Alternatively, the terminal determines the first angular velocity for perspective rotation according to the rotation angular velocity.

Step 205. Display a third perspective picture of the application in the virtual environment in response to that the perspective rotation operation meets the perspective rotation accelerating condition.

The third perspective picture is a picture of the virtual environment that is observed from a third perspective of the virtual player in a third observation direction, and the third observation direction is obtained through rotation according to a second angular velocity by using the first observation direction as a reference.

The terminal determines a perspective rotation direction according to an operation direction of the perspective rotation operation, determines the second angular velocity for perspective rotation according to the operation parameter of the perspective rotation operation, to determine a second angle for perspective rotation according to the second angular velocity of the perspective rotation operation, and performs rotation by the second angle according to the determined perspective rotation direction by using the first observation direction as a reference to obtain the third observation direction, so that the third perspective picture corresponding to the third observation direction is determined.

Based on the above, according to the perspective rotation method provided in this application, a first perspective picture of an application is displayed; a perspective rotation operation triggered on a perspective rotation control provided on the first perspective picture is received, the first perspective picture being a picture of a virtual environment that is observed from a first perspective of a virtual player of the application in a first observation direction; a second perspective picture of the application is displayed in response to that the perspective rotation operation does not meet a perspective rotation accelerating condition, the second perspective picture being a picture of the virtual environment that is observed from a second perspective of the virtual player in a second observation direction, the second observation direction being obtained through rotation according to a first angular velocity by using the first observation direction as a reference; and a third perspective picture of the application is displayed in response to that the perspective rotation operation meets the perspective rotation accelerating condition, the third perspective picture being a picture of the virtual environment that is observed from a third perspective of the virtual player in a third observation direction, the third observation direction being obtained through rotation according to a second angular velocity by using the first observation direction as a reference, and the first angular velocity being less than the second angular velocity. Therefore, in a large-angle perspective rotation scenario, when the perspective rotation accelerating condition is met, a large-angle rotation can be rapidly implemented by using the larger second angular velocity, so that frequent perspective rotations are not needed in a process of operating the application, and user operation efficiency is improved.

In addition, when the perspective rotation operation meets the perspective rotation accelerating condition, the perspective rotation operation of accelerating the perspective rotation is performed, thereby reducing the possibility of accidental touch, and improving the operation efficiency.

Figure 5:
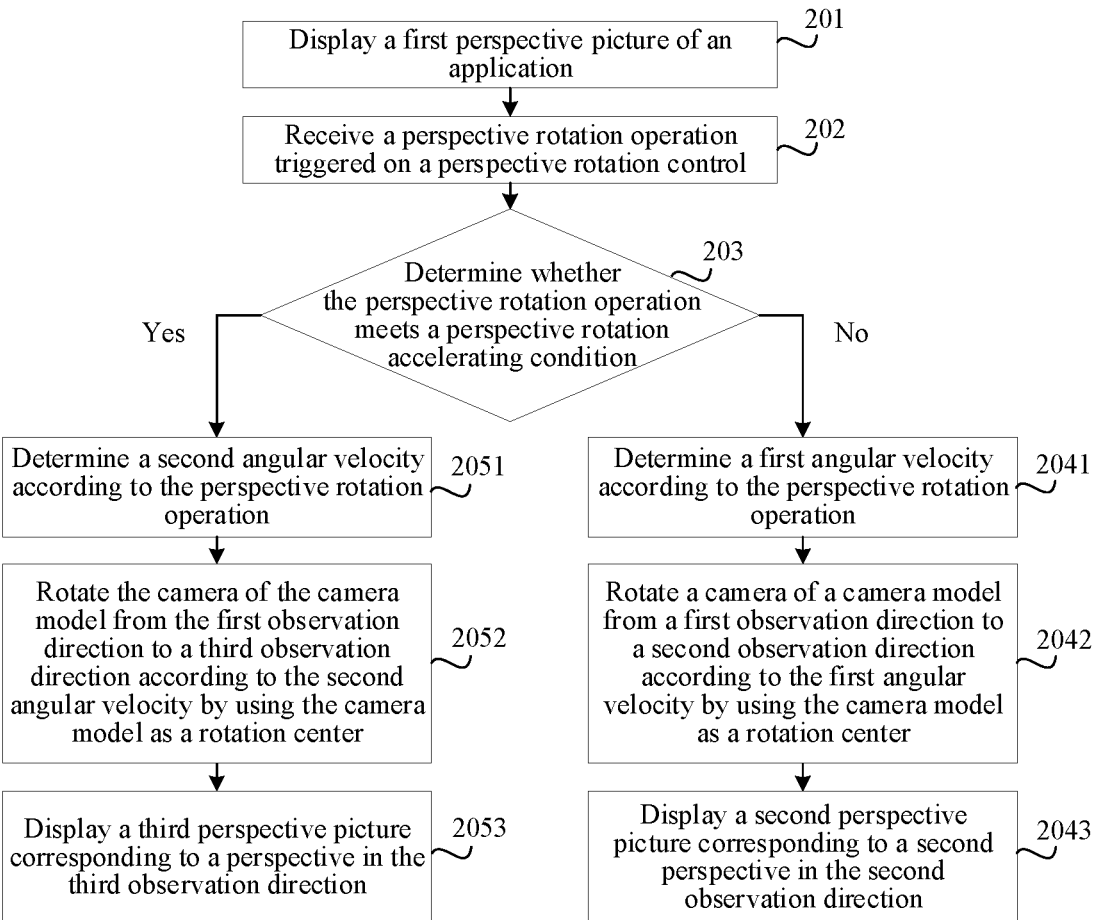
FIG. 5 is a flowchart of a perspective rotation method according to another exemplary embodiment of this application.

FIG. 5 is a flowchart of a perspective rotation method according to another exemplary embodiment of this application. Based on the flowchart shown in FIG. 4, step 204 is replaced with step 2041 to step 2043, and step 205 is replaced with step 2051 to step 2053, to describe a perspective rotation process in detail. The method includes the following steps.

Step 2041. Determine the first angular velocity according to the perspective rotation operation.

Figure 6:
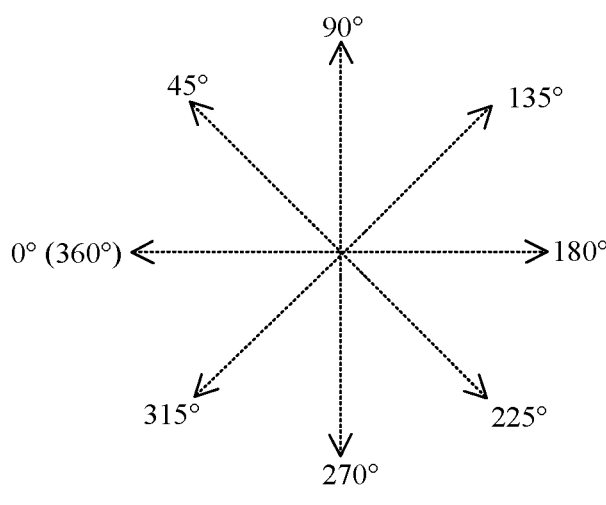
FIG. 6 is a schematic diagram of a perspective rotation direction according to an exemplary embodiment of this application.
Figure 7:
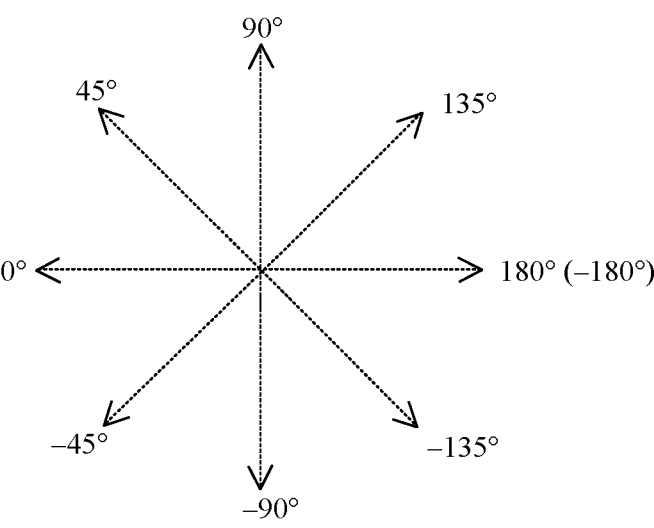
FIG. 7 is a schematic diagram of a perspective rotation direction according to another exemplary embodiment of this application.

A direction indicated by the perspective rotation operation is a perspective rotation direction. Schematically, a direction division manner may include at least one of the following: 1. As shown in FIG. 6, dragging to the left is 0°, and an angle is clockwise increased progressively to 360°. 2. As shown in FIG. 7, dragging to the left is 0°, and an angle is clockwise increased progressively to 180°, or is counterclockwise decreased progressively to −180°.

The terminal determines that an angular velocity for perspective rotation is the first angular velocity in response to that the perspective rotation operation does not meet the perspective rotation accelerating condition.

In some embodiments, a preset angular velocity is set in the terminal. The preset angular velocity may be a default angular velocity or an angular velocity set by the user, and a value of the preset angular velocity is less than any value of the second angular velocity. When the perspective rotation operation does not meet the perspective rotation accelerating condition, the terminal determines the preset angular velocity as the first angular velocity.

Step 2042. Rotate a camera of the camera model from the first observation direction to the second observation direction according to the first angular velocity by using the camera model as a rotation center.

The first observation direction refers to a direction pointed by a camera orientation of the camera model in the virtual environment.

The perspective rotation operation further includes an operation duration. The terminal multiplies the first angular velocity by the operation duration to obtain a first angle for perspective rotation. The terminal rotates the camera of the camera model by the first angle by using the camera model as a rotation center and using the perspective rotation direction as a rotation direction of the camera model. Then, the second observation direction of the virtual role is obtained.

Step 2043. Display the second perspective picture corresponding to the second perspective in the second observation direction.

Step 2051. Determine the second angular velocity according to the perspective rotation operation.

In some embodiments, the terminal determines an area range according to an operation direction of the perspective rotation operation. Each area range corresponds to N range thresholds, N being a positive integer. A 360° direction range of an origin may be divided into k area ranges. For example, k=2. As shown in FIG. 6 or FIG. 7, by using a horizontal direction in which 0° and 180° are located as a boundary, the 360° direction range is divided into an upper area range and a lower area range.

In some embodiments, the area range includes a horizontal area range and a vertical area range. Schematically, k=2. As shown in FIG. 7, a direction range of 45° to 135° and a direction range of ~45° to −135° are divided as vertical direction areas, and a direction range of ~45° to 45° and a direction range of 135° to −135° are divided as horizontal direction areas.

Alternatively, a direction range of 75° to 105° and a direction range of ~75° to −105° are divided as vertical direction areas, and a direction range of ~15° to 15° and a direction range of 165° to −165° are divided as horizontal direction areas.

The range threshold refers to a value range preset in the terminal, and the value range corresponds to an angular velocity. When the operation parameter of the perspective rotation operation belongs to the value range, the corresponding angular velocity is determined as the second angular velocity, that is, an $h^{th}$ value range corresponds to an $h^{th}$ angular velocity. When the operation parameter of the perspective rotation operation belongs to the $h^{th}$ value range, the corresponding $h^{th}$ angular velocity is determined as the second angular velocity, h being a positive integer. The second angular velocity is greater than the first angular velocity.

In some embodiments, each area range corresponds to N range thresholds. The terminal determines that the operation parameter of the perspective rotation operation belongs to an $i^{th}$ range threshold in the N range thresholds, the $i^{th}$ range threshold including an $i^{th}$ angular velocity, and determines the $i^{th}$ angular velocity as the second angular velocity.

Schematically, a horizontal area range and a vertical area range are set in the terminal. The horizontal area range includes three range thresholds: a first range threshold, a second range threshold, and a third range threshold, and the vertical area range includes three range thresholds: a fourth range threshold, a fifth range threshold, and a sixth range threshold. The first range threshold, the second range threshold, and the third range threshold are continuous values. For example, the operation parameter is the movement distance. As shown in Table 1, the first range threshold is (2, 3], which means being greater than 2 cm and less than or equal to 3 cm; the second range threshold is (3, 4], which means being greater than 3 cm and less than or equal to 4 cm; and the third range threshold is (4, 5], which means being greater than 4 cm and less than or equal to 5 cm. The fourth range threshold, the fifth range threshold, and the sixth range threshold are also continuous values, and examples are not listed for description herein.

TABLE 1

| Area range | Range threshold | Angular velocity |
| --- | --- | --- |
| Horizontal area range | (2, 3] | $A_1$ |
| | (3, 4] | $A_2$ |
| | (4, 5] | $A_3$ |

Quantities of range thresholds of the horizontal area range and the vertical area range may be the same or different, and N range thresholds corresponding to the horizontal area range may be the same as or different from N range thresholds corresponding to the vertical area range. For example, the horizontal area range includes three range thresholds, and the vertical area range also includes three range thresholds. Alternatively, the horizontal area range includes four range thresholds, and the vertical area range includes two range thresholds.

When both the horizontal area range and the vertical area range include three range thresholds, as examples of the range thresholds of the horizontal area range are given above, range values of the fourth range threshold, the fifth range threshold, and the sixth range threshold are the same as those of the first range threshold, the second range threshold, and the third range threshold. Alternatively, as shown in Table 2, the fourth range threshold is (1, 2], which means being greater than 1 cm and less than or equal to 2 cm; the fifth range threshold is (2, 3], which means being greater than 2 cm and less than or equal to 3 cm; and the sixth range threshold is (3, 4], which means being greater than 3 cm and less than or equal to 4 cm. Range values of the fourth range threshold, the fifth range threshold, and the sixth range threshold are different from those of the first range threshold, the second range threshold, and the third range threshold.

TABLE 2

| Area range | Range threshold | Angular velocity |
| --- | --- | --- |
| Vertical area range | (1, 2] | $A_4$ |
| | (2, 3] | $A_5$ |
| | (3, 4] | $A_6$ |

Based on Table 1 and Table 2, how to determine the second angular velocity is described by using an example in which the operation parameter is the movement distance. Schematically, the terminal determines the perspective rotation direction according to the operation direction of the perspective rotation operation. If the perspective rotation direction belongs to the horizontal area range, when the movement distance belongs to (2, 3], $A_1$ is determined as the second angular velocity, when the movement distance belongs to (3, 4], $A_2$ is determined as the second angular velocity, and when the movement distance belongs to (4, 5], $A_3$ is determined as the second angular velocity, $A_3 > A_2 > A_1$, ">" meaning being greater than. If the perspective rotation operation belongs to the vertical area range, when the movement distance belongs to (1, 2], $A_4$ is determined as the second angular velocity, when the movement distance belongs to (2, 3], $A_5$ is determined as the second angular velocity, and when the movement distance belongs to (3, 4], $A_6$ is determined as the second angular velocity, $A_6 > A_5 > A_4$.

For how the terminal determines the perspective rotation direction according to the operation direction of the perspective rotation operation, refer to FIG. 6. If the operation direction is a direction indicated by 0°, the perspective rotation direction is the direction indicated by 0°, and it is also determined that the area range is the horizontal area range. When the movement distance of the perspective rotation operation is 5 cm, by querying Table 1, the terminal determines that the movement distance belongs to the third range threshold, and the third range threshold corresponds to the angular velocity $A_3$, and the terminal determines $A_3$ as the second angular velocity for perspective rotation. The second angular velocity is greater than the first angular velocity.

In some embodiments, the operation parameter and the angular velocity may alternatively be a positively correlated function relationship. For example, the function relationship may include a linear relationship or an exponential relationship. Using the linear relationship between the operation parameter and the angular velocity as an example, a linear relationship between an operation parameter x and an angular velocity w may be expressed as w=f(x), f(x) being an expression of the linear relationship between the angular velocity w and the operation parameter x.

Step 2052. Rotate the camera of the camera model from the first observation direction to the third observation direction according to the second angular velocity by using the camera model as a rotation center.

The perspective rotation operation further includes an operation duration. The terminal multiplies the second angular velocity by the operation duration to obtain a second angle for perspective rotation. The terminal rotates the camera of the camera model by the second angle by using the camera model as a rotation center and using the perspective rotation direction indicated by 0° as a rotation direction of the camera model, and then switches from the first observation direction of the virtual role to the third observation direction.

Step 2053. Display the third perspective picture corresponding to the third perspective in the third observation direction.

Based on the above, in the perspective rotation method provided in this embodiment, through strict division of range thresholds, the user can change the angular velocity for perspective rotation by changing the movement distance, the movement linear velocity, or the rotation angular velocity of the operation, so as to achieve perspective rotation angles at different degrees, improve the perspective rotation efficiency, and improve the user operation efficiency as well as user experience.

Figure 8:
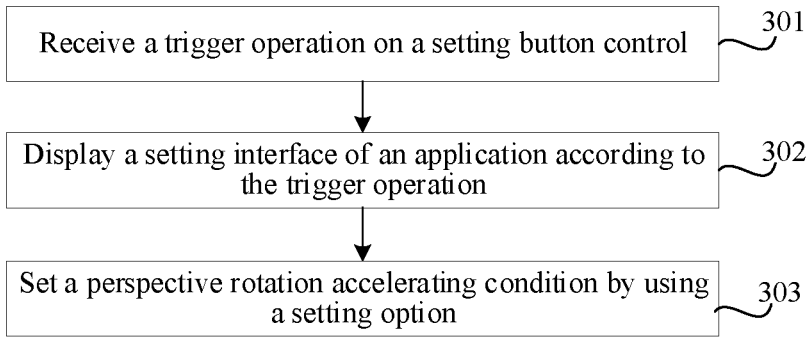
FIG. 8 is a flowchart of a perspective rotation method according to another exemplary embodiment of this application.

FIG. 8 is a flowchart of a perspective rotation method according to another exemplary embodiment of this application. The method is provided for a user to customize a perspective rotation accelerating condition. For example, the method is applicable to the terminal shown in FIG. 2 or FIG. 3. The method includes the following steps.

Step 301. Receive a trigger operation on a setting button control.

The terminal displays a first perspective picture, the first perspective picture being provided with the setting button control. The terminal receives an operation that is triggered by a user on the setting button control to display a setting interface.

Step 302. Display a setting interface of an application according to the trigger operation.

The setting interface of the application is displayed on the terminal and includes a setting option of the perspective rotation accelerating condition.

Step 303. Set the perspective rotation accelerating condition by using the setting option.

The perspective rotation accelerating condition includes an angular velocity for accelerating perspective rotation. The setting option is used for setting the angular velocity for accelerating perspective rotation.

In some embodiments, the setting option includes a fixed option and a custom option for sensitivity that are preset in the terminal. The fixed option and custom option for sensitivity are used for setting a first angular velocity in the terminal. In some embodiments, the terminal indirectly sets a second angular velocity by setting the first angular velocity.

Figure 9:
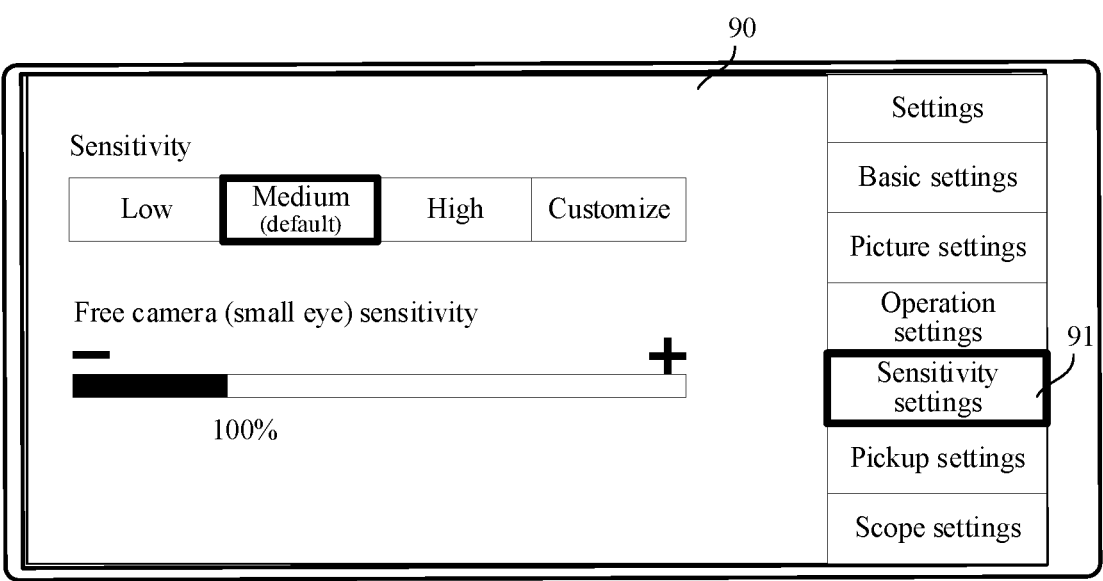
FIG. 9 is a schematic interface diagram of a perspective rotation direction according to an exemplary embodiment of this application.

Schematically, FIG. 9 shows a setting interface 90 of the application. The setting interface includes a sensitivity setting 91. A default first angular velocity for perspective rotation in the terminal is p, that is, when "medium" in the figure is selected, the sensitivity of a "small eye" is 100%. For example, an area range includes a horizontal area range and a vertical area range, and both the horizontal area range and the vertical area range correspond to three range thresholds. An angular velocity 1 corresponding to a first range threshold in the horizontal area range is 1.2 times of the first angular velocity, then the angular velocity 1 is 1.2p; an angular velocity 2 corresponding to a second range threshold is 1.8 times of the first angular velocity, then the angular velocity 2 is 1.8p; an angular velocity 3 corresponding to the third range threshold is 2.5 times of the first angular velocity, then the angular velocity 3 is 2.5p; an angular velocity 4 corresponding to a fourth range threshold in the vertical area range is 1.2 times of the first angular velocity, then the angular velocity 4 is 1.2p; an angular velocity 5 corresponding to a fifth range threshold is 1.5 times of the first angular velocity, then the angular velocity 5 is 1.5p; and an angular velocity 6 corresponding to a sixth range threshold is 1.8 times of the first angular velocity, then the angular velocity 6 is 1.8p. When the user sets the sensitivity of the "small eye" to 150%, the first angular velocity is 1.5p, and accordingly, the angular velocity 1 is 1.2*1.5p, the angular velocity 2 is 1.8*1.5p, the angular velocity 3 is 2.5*1.5p, the angular velocity 4 is 1.2*1.5p, the angular velocity 5 is 1.5*1.5p, and the angular velocity 6 is 1.8*1.5p.

Based on the above, in the perspective rotation method provided in this embodiment, the second angular velocity is indirectly set by setting the first angular velocity in the setting interface, so that the user may customize the angular velocity for accelerating perspective rotation according to a requirement of the user, which improves user experience.

Figure 10:
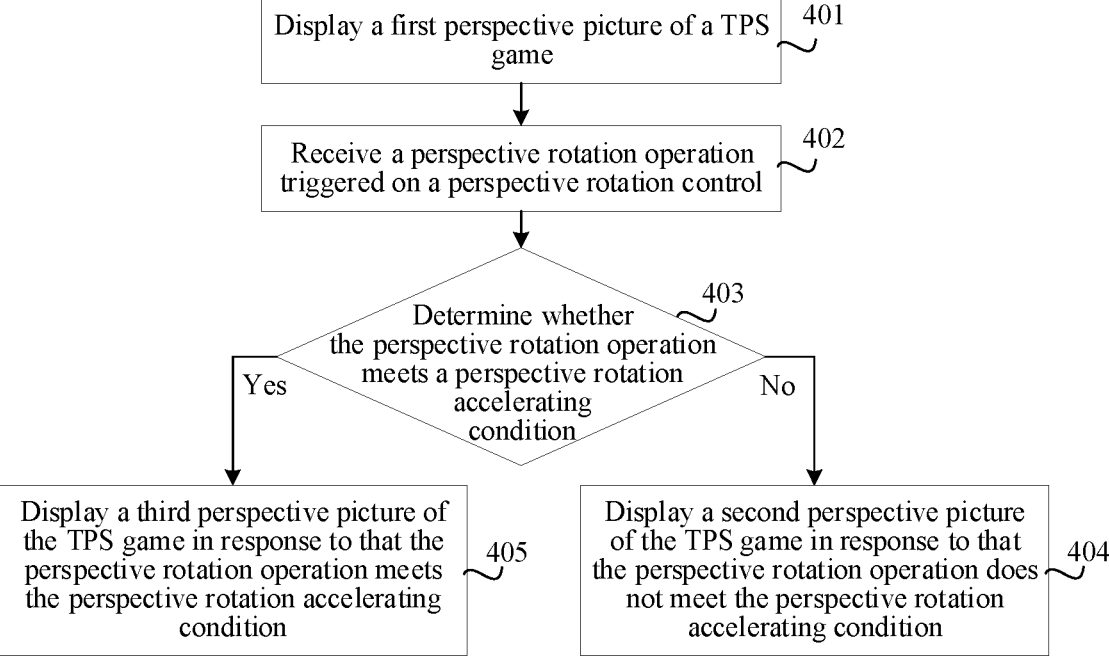
FIG. 10 is a flowchart of a perspective rotation method according to another exemplary embodiment of this application.

FIG. 10 is a flowchart of a perspective rotation method according to another exemplary embodiment of this application. For example, the method is applicable to the terminal shown in FIG. 2 or FIG. 3, a TPS game being installed and run on the terminal. The method includes the following steps.

Step 401. Display a first perspective picture of the TPS game.

The first perspective picture is a picture of a virtual environment that is observed from a first perspective of a virtual character in a first observation direction, and the first perspective picture is further provided with a perspective rotation control.

The first perspective is a third-person perspective, and the virtual character is included in a virtual picture corresponding to the third-person perspective.

Step 402. Receive a perspective rotation operation triggered on the perspective rotation control by a user of the terminal.

The terminal receives the perspective rotation operation triggered on the perspective rotation control. In some embodiments, an operation parameter of the perspective rotation operation includes a movement distance generated on a screen and a movement linear velocity generated on the screen.

The movement distance generated on the screen refers to a slide distance on the screen during the user operation, and the movement linear velocity generated on the screen refers to a slide speed on the screen during the user operation. In some embodiments, the user operation may be a slide operation on a touch screen performed by the user. In some embodiments, the speed is represented by using a quantity of pixels that the slide operation slides per second.

Step 403. Determine whether the perspective rotation operation meets a perspective rotation accelerating condition.

In some embodiments, the terminal determines whether the perspective rotation operation meets the perspective rotation accelerating condition according to the movement distance generated on the screen. A distance threshold L is preset in the terminal. It is determined that the perspective rotation operation does not meet the perspective rotation accelerating condition in response to that the movement distance generated on the screen is less than L, and step 404 is performed; otherwise, it is determined that the perspective rotation operation meets the perspective rotation accelerating condition in response to that the movement distance is greater than or equal to L, and step 405 is performed.

Step 404. Display a second perspective picture of the TPS game in response to that the perspective rotation operation does not meet the perspective rotation accelerating condition.

The second perspective picture is a picture of the virtual environment that is observed from a second perspective of the virtual character in a second observation direction, and the second observation direction is obtained through rotation according to a first angular velocity by using the first observation direction as a reference.

In some embodiments, a direction indicated by the perspective rotation operation direction is a perspective rotation direction. The terminal determines that an angular velocity for perspective rotation is the first angular velocity in response to that the perspective rotation operation does not meet the perspective rotation accelerating condition.

The perspective rotation operation further includes an operation duration. The terminal multiplies the first angular velocity by the operation duration to obtain a first angle for perspective rotation. The terminal rotates, by using a camera model as a rotation center, a camera of the camera model by the first angle from the first observation direction to the second observation direction according to the perspective rotation direction, determines the second perspective in the second observation direction, and displays the second perspective picture corresponding to the second perspective.

Step 405. Display a third perspective picture of the TPS game in response to that the perspective rotation operation meets the perspective rotation accelerating condition.

The third perspective picture is a picture of the virtual environment that is observed from a third perspective of the virtual character in a third observation direction, and the third observation direction is obtained through rotation according to a second angular velocity by using the first observation direction as a reference.

In some embodiments, an area range is set in the terminal, and the area range includes a horizontal area range and a vertical area range. An area range of the perspective rotation operation is determined according to an operation direction of the perspective rotation operation. Both the horizontal area range and the vertical area range correspond to three range thresholds.

In some embodiments, a range threshold corresponding to the horizontal area range is different from a range threshold corresponding to the vertical area range with respect to range division. Therefore, the process of displaying the third perspective picture of the TPS game includes the following two cases:

1. the terminal determines that the operation direction belongs to the horizontal area range and determines the second angle; and
2. the terminal determines that the operation direction belongs to the vertical area range and determines the second angle.

In some embodiments, in a horizontal direction, the terminal determines that the movement linear velocity belongs to a $k^{th}$ range threshold in the three range thresholds, k being a positive integer less than or equal to 3.

Alternatively, in a vertical direction, the terminal determines that the movement linear velocity belongs to a $k^{th}$ range threshold in the three range thresholds, each range threshold corresponding to an angular velocity.

When the movement linear velocity belongs to the $k^{th}$ range threshold, the terminal determines an angular velocity corresponding to the $k^{th}$ range threshold as the second angular velocity, and calculates the second angle according to the second angular velocity.

The terminal rotates the camera of the camera model by the second angle by using the camera model as a rotation center and using the operation direction as a rotation direction of the camera model, then switches from the first observation direction of the virtual character to the third observation direction, and displays the third perspective picture corresponding to third perspective in the third observation direction.

Based on the above, according to the perspective rotation method provided in this embodiment, a first perspective picture of an application is displayed, the first perspective picture being a picture of a virtual environment that is observed from a first perspective of a virtual character in a first observation direction, and the first perspective picture being further provided with a perspective rotation control; a perspective rotation operation triggered on the perspective rotation control by a user of the terminal is received; a second perspective picture of the application is displayed in response to that the perspective rotation operation does not meet a perspective rotation accelerating condition, the second observation direction corresponding to the second perspective picture being obtained through rotation according to a first angular velocity by using the first observation direction as a reference; and a third perspective picture of the application is displayed in response to that the perspective rotation operation meets the perspective rotation accelerating condition, the third observation direction corresponding to the third perspective picture being obtained through rotation according to a second angular velocity by using the first observation direction as a reference, and the first angular velocity being less than the second angular velocity. Therefore, in a large-angle perspective rotation scenario, when the perspective rotation accelerating condition is met, a large-angle rotation can be rapidly implemented by using the larger second angular velocity, so that frequent perspective rotations are not needed in a process of operating the application, and user operation efficiency is improved.

In the perspective rotation method provided in this embodiment, through strict division of range thresholds, a user can change an angular velocity for perspective rotation by changing a movement distance or a movement linear velocity of the operation, so as to achieve perspective rotation angles at different degrees, improve the perspective rotation efficiency, and improve the user operation efficiency as well as user experience.

In addition, when the perspective rotation operation meets the perspective rotation accelerating condition, the perspective rotation operation of accelerating the perspective rotation is performed, thereby reducing the possibility of accidental touch, and improving the operation efficiency.

Figure 11:
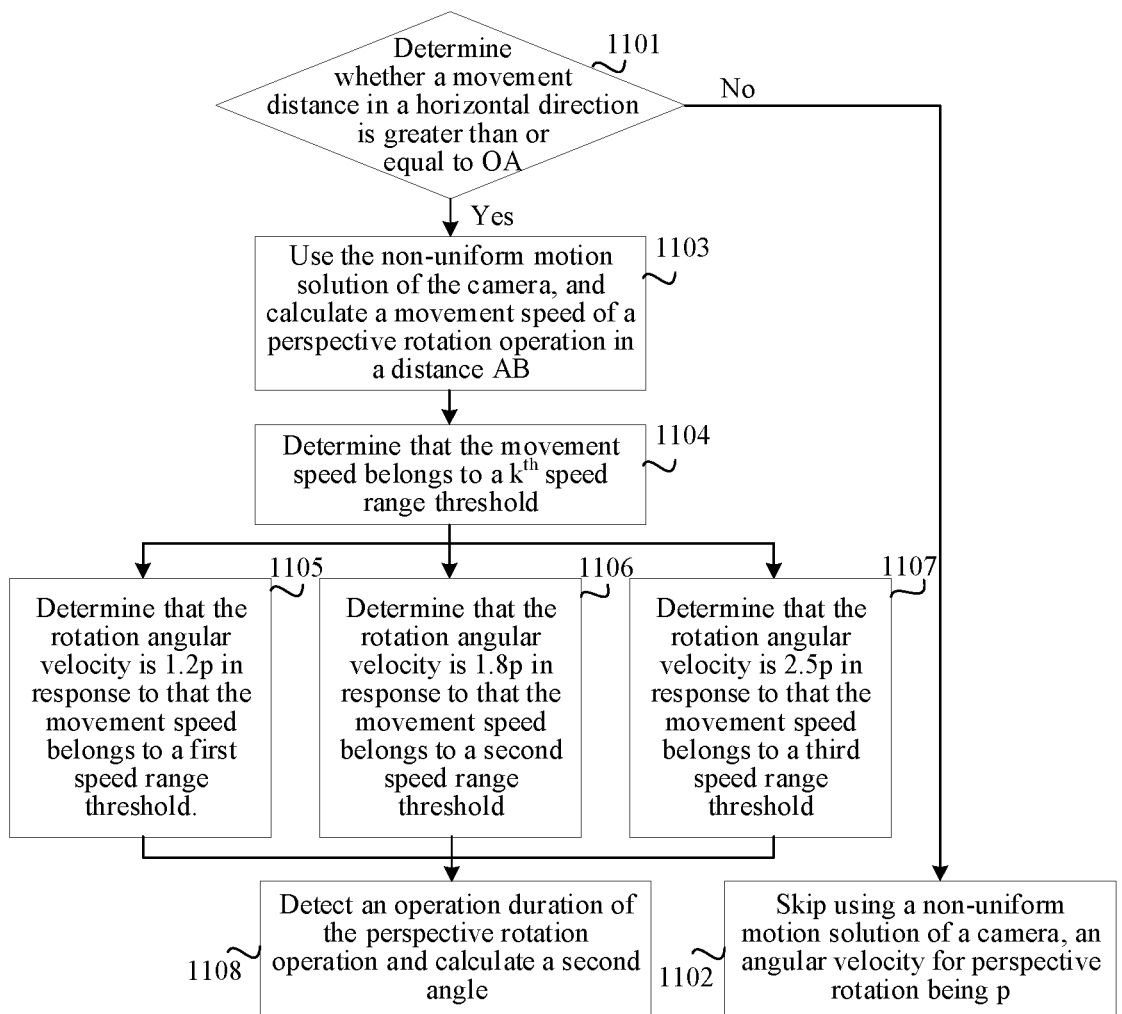
FIG. 11 is a flowchart of a perspective rotation method according to another exemplary embodiment of this application.
Figure 12:
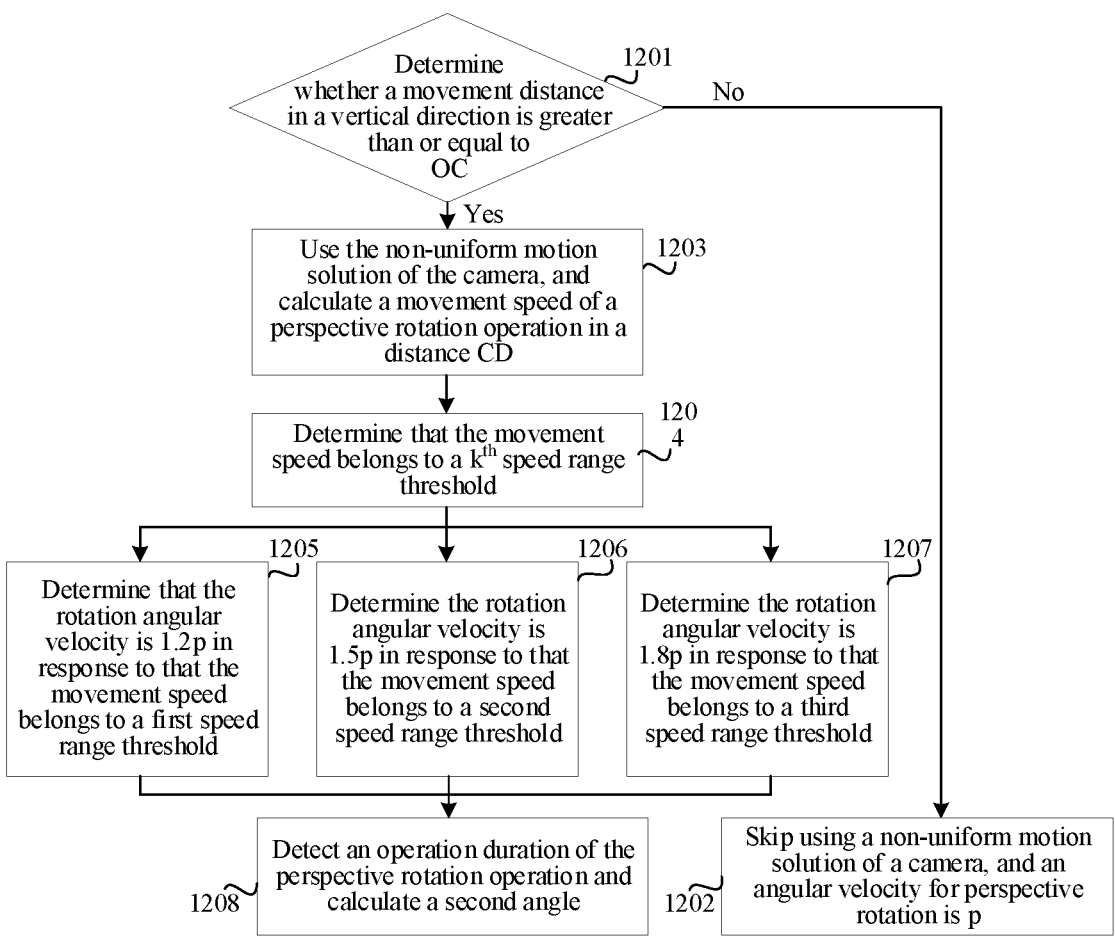
FIG. 12 is a flowchart of a perspective rotation method according to another exemplary embodiment of this application.

Based on the embodiment provided in FIG. 10, a range threshold corresponding to the horizontal area range is different from a range threshold corresponding to the vertical area range with respect to range division. Therefore, the process of displaying the third perspective picture of the TPS game includes the following two cases:

1. the terminal determines that the operation direction belongs to the horizontal area range and determines the second angle, as shown in FIG. 11; and
2. the terminal determines that the operation direction belongs to the vertical area range and determines the second angle, as shown in FIG. 12.

When the terminal determines that the operation direction belongs to the horizontal area range, the steps of determining the second angle are as follows:

Step 1101. Determine whether a movement distance in a horizontal direction is greater than or equal to OA.

Figure 13:
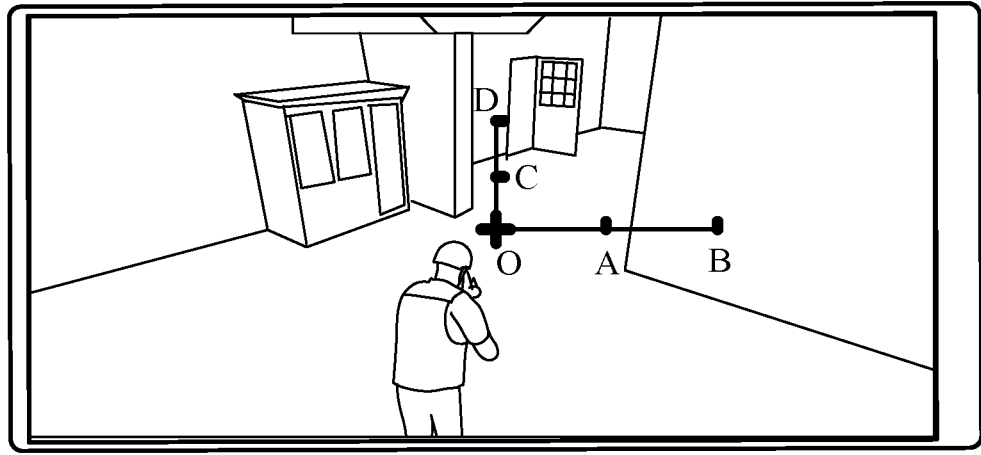
FIG. 13 is a schematic interface diagram of a perspective rotation method according to another exemplary embodiment of this application.

Referring to FIG. 13, OA represents a distance from a crosshair O to a point A on the right in the horizontal direction, and AB represents a distance from the point A to a point B.

The terminal determines whether the movement distance in the horizontal direction is greater than or equal to OA. Step 1102 is performed in response to that the movement distance is less than OA; otherwise, step 1103 is performed in response to that the movement distance is greater than or equal to OA.

Step 1102. Skip using a non-uniform motion solution of the camera, an angular velocity for perspective rotation being p.

If the movement distance is less than OA, the perspective rotation operation does not meet the perspective rotation accelerating condition, the non-uniform motion solution of the camera is not used, and the angular velocity for perspective rotation is the first angular velocity p.

Step 1103. Use the non-uniform motion solution of the camera, and calculate a movement speed of the perspective rotation operation in the distance AB.

In some embodiments, if the movement distance is greater than or equal to OA, the perspective rotation operation meets the perspective rotation accelerating condition, the non-uniform motion solution of the camera is used, and a quantity of pixels that the perspective rotation operation slides in a unit time is calculated to obtain a movement speed a.

Step 1104. Determine that the movement speed belongs to a $k^{th}$ speed range threshold.

In some embodiments, the horizontal area range corresponds to three speed range thresholds. A first speed range threshold is 5 pixel/s<a≤10 pixel/s, a second speed range threshold is 10 pixel/s<a≤20 pixel/s, and a third speed range threshold is 20 pixel/s<a, pixel/s representing a quantity of pixels that the operation slides per second.

The terminal determines that the movement speed a belongs to the first speed range threshold, the second speed range threshold, or the third speed range threshold.

Step 1105. Determine that the rotation angular velocity is 1.2p in response to that the movement speed belongs to the first speed range threshold.

In some embodiments, if the movement speed a conforms to 5 pixel/s<a≤10 pixel/s, the terminal determines that the rotation angular velocity is a second angular velocity 1.2p, and step 1108 is performed.

Step 1106. Determine that the rotation angular velocity is 1.8p in response to that the movement speed belongs to the second speed range threshold.

In some embodiments, if the movement speed a conforms to 10 pixel/s<a≤20 pixel/s, the terminal determines that the rotation angular velocity is a second angular velocity 1.8p, and step 1108 is performed.

Step 1107. Determine that the rotation angular velocity is 2.5p in response to that the movement speed belongs to the third speed range threshold.

In some embodiments, if the movement speed a conforms to 20 pixel/s<a, the terminal determines that the rotation angular velocity is a second angular velocity 2.5p, and step 1108 is performed.

Step 1108. Detect an operation duration of the perspective rotation operation and calculate the second angle.

When the perspective rotation angle is the second angular velocity, the terminal multiplies the second angular velocity by the operation duration to obtain the second angle.

Figure 14:
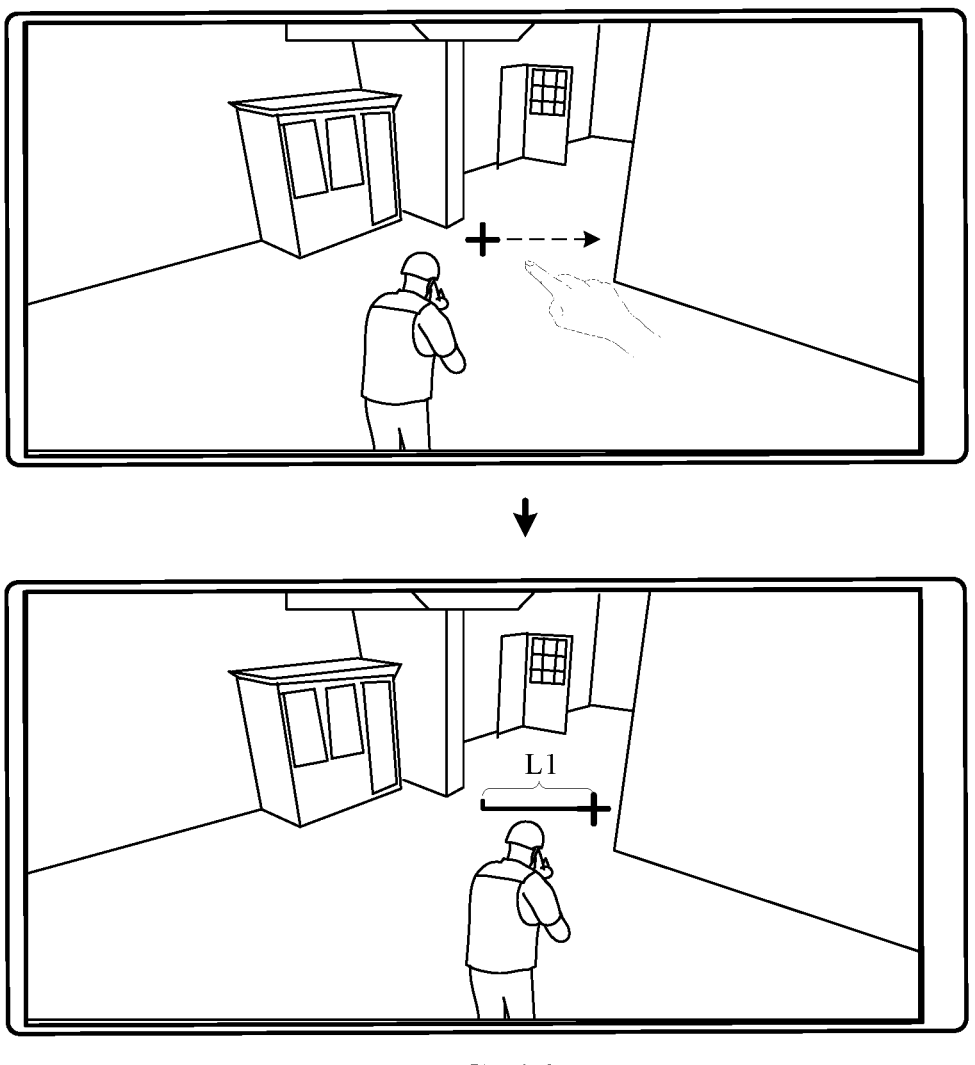
FIG. 14 is a schematic interface diagram of a perspective rotation method according to another exemplary embodiment of this application.
Figure 15:
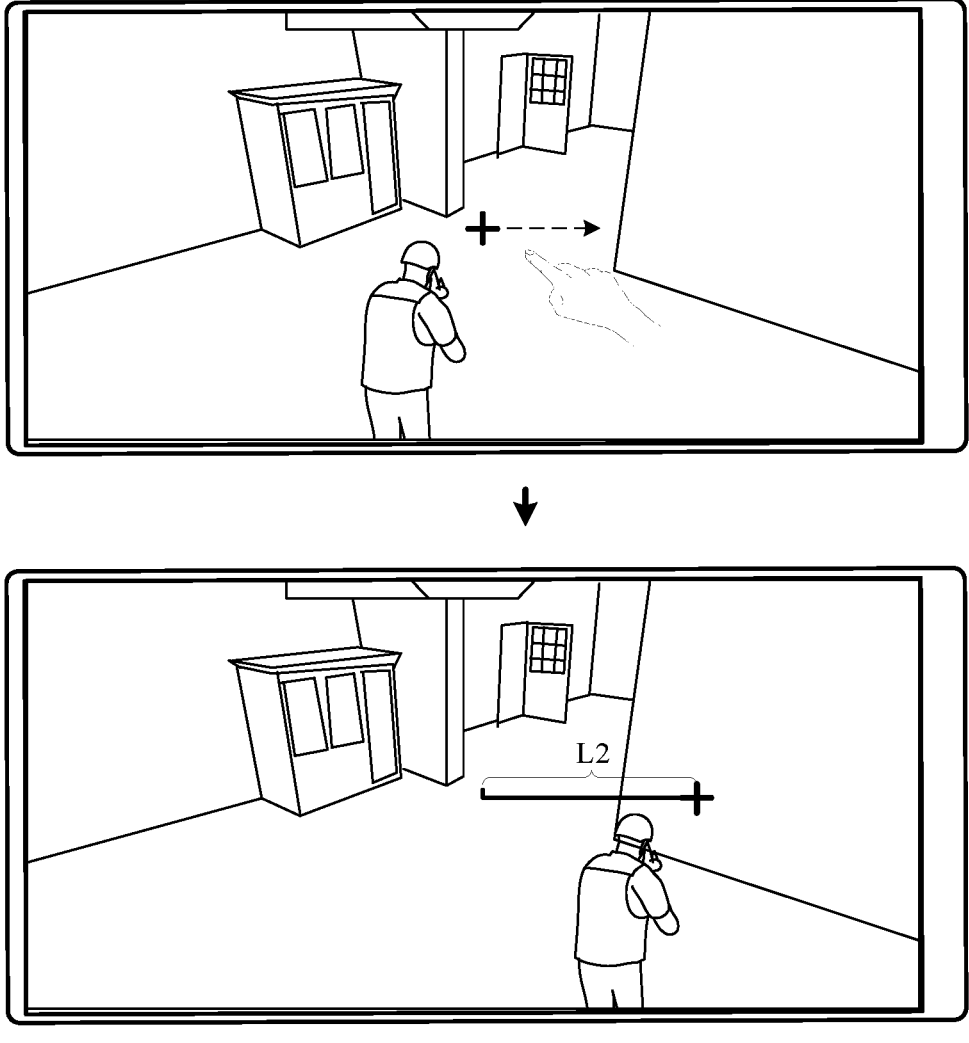
FIG. 15 is a schematic interface diagram of a perspective rotation method according to another exemplary embodiment of this application.
Figure 16:
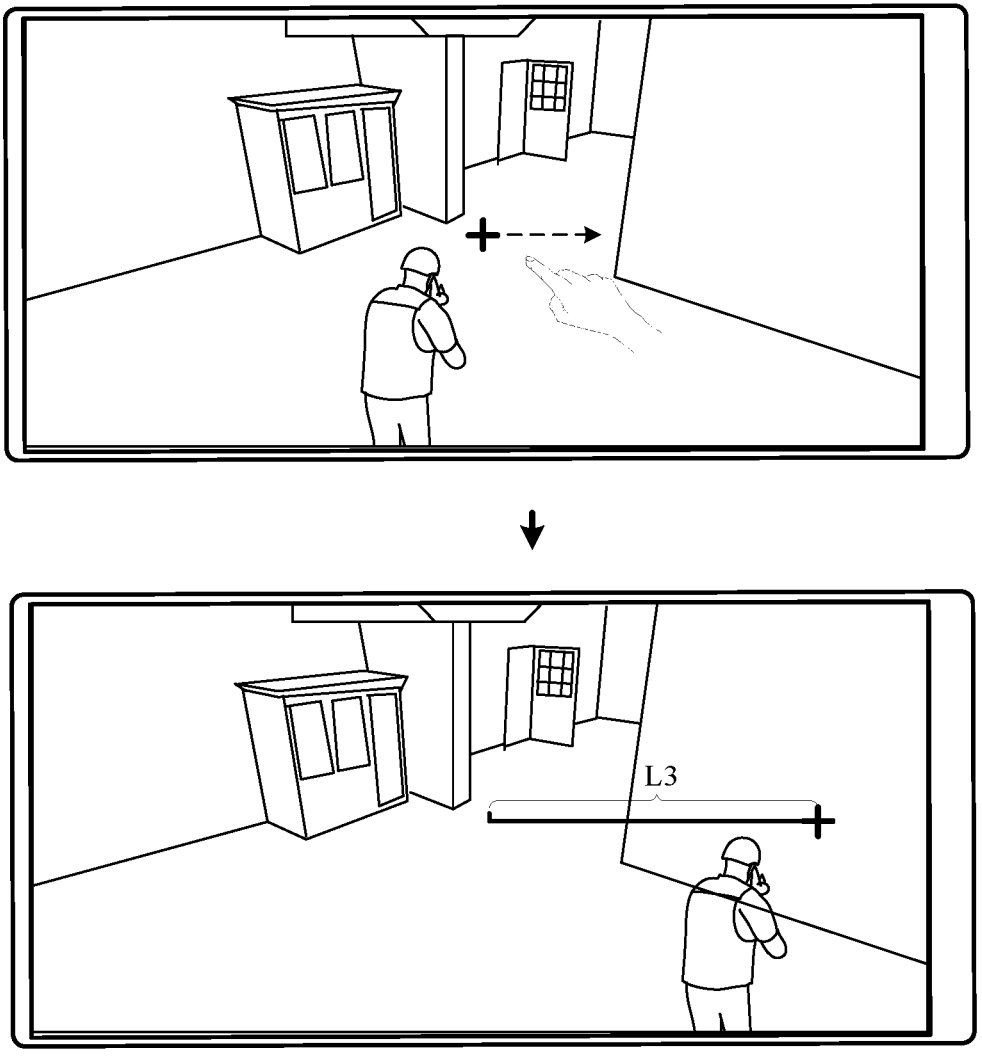
FIG. 16 is a schematic interface diagram of a perspective rotation method according to another exemplary embodiment of this application.

Schematically, as shown in FIG. 14, when the movement speed meets the first speed range threshold, the terminal moves by a distance L1. As shown in FIG. 15, when the movement speed meets the second speed range threshold, the terminal moves by a distance L2. As shown in FIG. 16, when the movement speed meets the third speed range threshold, the terminal moves by a distance L3. For the same operation duration, different second angular velocities are obtained. A larger second angular velocity indicates a larger perspective rotation angle.

When the terminal determines that the operation direction belongs to the vertical area range, the steps of determining the second angle are as follows:

Step 1201. Determine whether a movement distance in a vertical direction is greater than or equal to OC.

Referring to FIG. 13, OC represents an upward distance from a crosshair O to a point C in the vertical direction, and CD represents a distance from the point C to a point D.

The terminal determines whether the movement distance in the vertical direction is greater than or equal to OC. Step 1202 is performed in response to that the movement distance is less than OC; otherwise, step 1203 is performed in response to that the movement distance is greater than or equal to OC.

Step 1202. Skip using a non-uniform motion solution of the camera, an angular velocity for perspective rotation being p.

If the movement distance is less than OC, the perspective rotation operation does not meet the perspective rotation accelerating condition, the non-uniform motion solution of the camera is not used, and the angular velocity for perspective rotation is the first angular velocity p.

Step 1203. Use the non-uniform motion solution of the camera, and calculate a movement speed of the perspective rotation operation in the distance CD.

In some embodiments, if the movement distance is greater than or equal to OC, the perspective rotation operation meets the perspective rotation accelerating condition, the non-uniform motion solution of the camera is used, and a quantity of pixels that the perspective rotation operation slides in a unit time is calculated to obtain a movement speed b.

Step 1204. Determine that the movement speed belongs to a $k^{th}$ speed range threshold.

In some embodiments, the vertical area range corresponds to three speed range thresholds. A first speed range threshold is 5 pixel/s<b≤8 pixel/s, a second speed range threshold is 8 pixel/s<b≤12 pixel/s, and a third speed range threshold is 12 pixel/s<b, pixel/s representing a quantity of pixels that the operation slides per second.

The terminal determines that the movement speed b belongs to the first speed range threshold, the second speed range threshold, or the third speed range threshold.

Step 1205. Determine that the rotation angular velocity is 1.2p in response to that the movement speed belongs to the first speed range threshold.

In some embodiments, if the movement speed b conforms to 5 pixel/s<b≤8 pixel/s, the terminal determines that the rotation angular velocity is a second angular velocity 1.2p, and step 1208 is performed.

Step 1206. Determine that the rotation angular velocity is 1.5p in response to that the movement speed belongs to the second speed range threshold.

In some embodiments, if the movement speed b conforms to 8 pixel/s<b≤12 pixel/s, the terminal determines that the rotation angular velocity is a second angular velocity 1.5p, and step 1208 is performed.

Step 1207. Determine that the rotation angular velocity is 1.8p in response to that the movement speed belongs to the third speed range threshold.

In some embodiments, if the movement speed b conforms to 12 pixel/s<b, the terminal determines that the rotation angular velocity is a second angular velocity 1.8p, and step 1208 is performed.

Step 1208. Detect an operation duration of the perspective rotation operation and calculate the second angle.

When the perspective rotation angle is the second angular velocity, the terminal multiplies the second angular velocity by the operation duration to obtain the second angle.

Based on the above, in the perspective rotation method provided in this embodiment, range thresholds are set in both the horizontal direction and the vertical direction. Through strict division of range thresholds in different directions, the user can change the rotation angular velocity for perspective rotation by changing the movement distance or the movement linear velocity of the operation, so as to achieve perspective rotation angles at different degrees in different directions, improve the perspective rotation efficiency, and improve the user operation efficiency as well as user experience.

Figure 17:
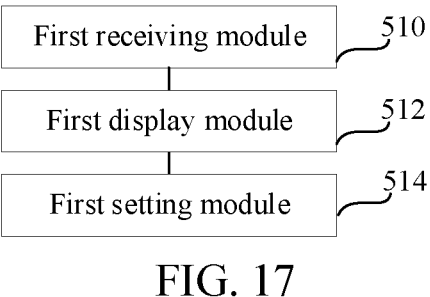
FIG. 17 is a block diagram of a perspective rotation apparatus according to an exemplary embodiment of this application.

FIG. 17 is a perspective rotation apparatus according to another exemplary embodiment of this application. The apparatus may be implemented as a terminal or a part of the terminal by means of software, hardware, or a combination thereof. The apparatus includes:

a first display module 512, configured to display a first perspective picture of an application, the first perspective picture being a picture of a virtual environment that is observed from a first perspective of a virtual player of the application in a first observation direction, and the first perspective picture being further provided with a perspective rotation control; and a first receiving module 510, configured to receive a perspective rotation operation triggered on the perspective rotation control by a user of the terminal;

the first display module 512 being configured to display a second perspective picture of the application in the virtual environment in response to that the perspective rotation operation does not meet a perspective rotation accelerating condition, the second perspective picture being a picture of the virtual environment that is observed from a second perspective of the virtual player in a second observation direction, the second observation direction being obtained through rotation according to a first angular velocity by using the first observation direction as a reference; and display a third perspective picture of the application in the virtual environment in response to that the perspective rotation operation meets the perspective rotation accelerating condition, the third perspective picture being a picture of the virtual environment that is observed from a third perspective of the virtual player in a third observation direction, the third observation direction being obtained through rotation according to a second angular velocity by using the first observation direction as a reference, and the first angular velocity being less than the second angular velocity.

In some embodiments, the first observation direction refers to a direction pointed by a camera orientation of a camera model in the virtual environment; and the first display module 512 is configured to determine the second angular velocity according to the perspective rotation operation; rotate a camera of the camera model from the first observation direction to the third observation direction according to the second angular velocity by using the camera model as a rotation center; and display the third perspective picture corresponding to the third perspective in the third observation direction.

In some embodiments, the first display module 512 is configured to determine that an operation parameter of the perspective rotation operation belongs to an $i^{th}$ range threshold in N range thresholds, the $i^{th}$ range threshold corresponding to an $i^{th}$ angular velocity; and determine the $i^{th}$ angular velocity as the second angular velocity, N and i being positive integers, and i being less than or equal to N.

In some embodiments, the first display module 512 is further configured to determine an area range according to an operation direction of the perspective rotation operation, each area range corresponding to N range thresholds.

In some embodiments, the area range includes a horizontal area range and a vertical area range.

In some embodiments, the operation parameter of the perspective rotation operation includes at least one of the following parameters:

a movement distance generated on a screen;

a movement linear velocity generated on the screen; and a rotation angular velocity of a terminal.

In some embodiments, the first perspective picture is provided with a setting button control;

the first receiving module 510 is configured to receive a trigger operation on the setting button control;

the first display module 512 is configured to display a setting interface of the application according to the trigger operation, the setting interface including a setting option of the perspective rotation accelerating condition; and the apparatus further includes:

a first setting module 514, configured to set the perspective rotation accelerating condition by using the setting option.

Based on the above, according to the perspective rotation apparatus provided in this embodiment, a first perspective picture of an application is displayed, the first perspective picture being a picture of a virtual environment that is observed from a first perspective, and the first perspective picture being further provided with a perspective rotation control; a perspective rotation operation triggered on the perspective rotation control by a user of the terminal is received; a second perspective picture of the application is displayed in a case that the perspective rotation operation does not meet a perspective rotation accelerating condition, a second perspective corresponding to the second perspective picture being obtained through rotation according to a first angular velocity by using the first perspective as a reference; and a third perspective picture of the application is displayed in a case that the perspective rotation operation meets the perspective rotation accelerating condition, a third perspective corresponding to the third perspective picture being obtained through rotation according to a second angular velocity by using the first perspective as a reference, and the first angular velocity being less than the second angular velocity. Therefore, in a large-angle perspective rotation scenario, when the perspective rotation accelerating condition is met, a large-angle rotation can be rapidly implemented by using the larger second angular velocity, so that frequent perspective rotations are not needed in a process of operating the application, and user operation efficiency is improved.

In the perspective rotation apparatus provided in this embodiment, efficiency range thresholds, a user can change an angular velocity for perspective rotation by changing a movement distance or a movement linear velocity of the operation, so as to achieve perspective rotation angles at different degrees, improve the perspective rotation efficiency, and improve the user operation efficiency as well as user experience.

In addition, when the perspective rotation operation meets the perspective rotation accelerating condition, the perspective rotation operation of accelerating the perspective rotation is performed, thereby reducing the possibility of accidental touch, and improving the operation efficiency.

Figure 18:
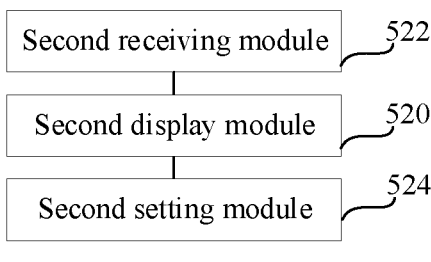
FIG. 18 is a block diagram of a perspective rotation apparatus according to another exemplary embodiment of this application.

FIG. 18 is a perspective rotation apparatus according to another exemplary embodiment of this application. The apparatus may be implemented as a terminal or a part of the terminal by means of software, hardware, or a combination thereof. The apparatus includes:

a second display module 520, configured to display a first perspective picture of a TPS game, the first perspective picture being a picture of a virtual environment that is observed from a first perspective of a virtual character, and the first perspective picture being further provided with a perspective rotation control; and a second receiving module 522, configured to receive a perspective rotation operation triggered on the perspective rotation control by a user of the terminal;

the second display module 520 being configured to display a second perspective picture of the TPS game in a case that the perspective rotation operation does not meet a perspective rotation accelerating condition, the second perspective picture being a picture of the virtual environment that is observed from a second perspective of the virtual character, the second perspective being obtained through rotation according to a first angular velocity by using the first perspective as a reference; and display a third perspective picture of the TPS game in a case that the perspective rotation operation meets the perspective rotation accelerating condition, the third perspective picture being a picture of the virtual environment that is observed from a third perspective of the virtual character, the third perspective being obtained through rotation according to a second angular velocity by using the first perspective as a reference, and the first angular velocity being less than the second angular velocity.

In some embodiments, the first observation direction refers to a direction pointed by a camera orientation of a camera model in the virtual environment; and the second display module 520 is configured to determine the second angular velocity according to the perspective rotation operation; rotate a camera of the camera model from the first observation direction to the third observation direction according to the second angular velocity by using the camera model as a rotation center; and display the third perspective picture corresponding to the third perspective in the third observation direction.

In some embodiments, the second display module 520 is configured to determine that an operation parameter of the perspective rotation operation belongs to an $i^{th}$ range threshold in N range thresholds, the $i^{th}$ range threshold corresponding to an $i^{th}$ angular velocity; and determine the $i^{th}$ angular velocity as the second angular velocity, N and i being positive integers, and i being less than or equal to N.

In some embodiments, the second display module 520 is further configured to determine an area range according to an operation direction of the perspective rotation operation, each area range corresponding to N range thresholds.

In some embodiments, the area range includes a horizontal area range and a vertical area range.

In some embodiments, the operation parameter of the perspective rotation operation includes at least one of the following parameters:

a movement distance generated on a screen;

a movement linear velocity generated on the screen; and a rotation angular velocity of a terminal.

In some embodiments, the first perspective picture is provided with a setting button control;

the second receiving module 522 is configured to receive a trigger operation on the setting button control;

the second display module 520 is configured to display a setting interface of the application according to the trigger operation, the setting interface including a setting option of the perspective rotation accelerating condition; and the apparatus further includes:

a second setting module 524, configured to set the perspective rotation accelerating condition by using the setting option.

In some embodiments, the second receiving module 522 is configured to receive a slide operation on the perspective rotation control, the slide operation being used for triggering a perspective rotation of the virtual character; and the second receiving module 522 is configured to receive a rotation operation of the terminal, the rotation operation of the terminal being used for triggering a perspective rotation of the virtual character.

Based on the above, according to the perspective rotation apparatus provided in this embodiment, a first perspective picture of an application is displayed, the first perspective picture being a picture of a virtual environment that is observed from a first perspective of a virtual character in a first observation direction, and the first perspective picture being further provided with a perspective rotation control; a perspective rotation operation triggered on the perspective rotation control by a user of the terminal is received; a second perspective picture of the application is displayed in response to that the perspective rotation operation does not meet a perspective rotation accelerating condition, the second observation direction corresponding to the second perspective picture being obtained through rotation according to a first angular velocity by using the first observation direction as a reference; and a third perspective picture of the application is displayed in response to that the perspective rotation operation meets the perspective rotation accelerating condition, the third observation direction corresponding to the third perspective picture being obtained through rotation according to a second angular velocity by using the first observation direction as a reference, and the first angular velocity being less than the second angular velocity. Therefore, in a large-angle perspective rotation scenario, when the perspective rotation accelerating condition is met, a large-angle rotation can be rapidly implemented by using the larger second angular velocity, so that frequent perspective rotations are not needed in a process of operating the application, and user operation efficiency is improved. In this application, the term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 19:
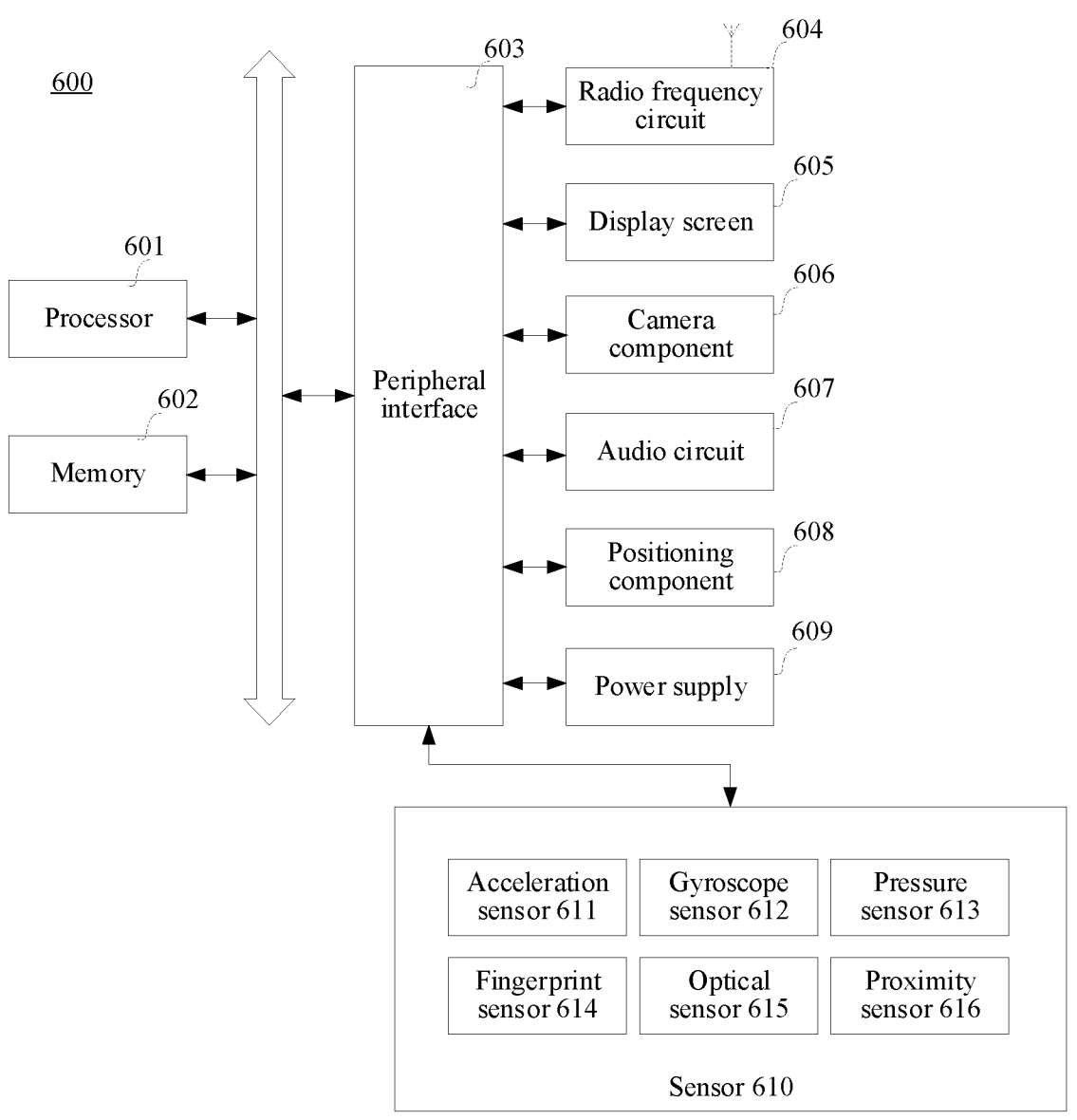
FIG. 19 is a structural block diagram of a terminal according to an exemplary embodiment of this application.

FIG. 19 is a structural block diagram of a terminal 600 according to an exemplary embodiment of the disclosure. The terminal 600 may be a smartphone, a tablet computer, a moving picture experts group audio layer III (MP3) player, an MP4 player, a notebook computer, or a desktop computer. The terminal 600 may also be referred to as another name such as user equipment, a portable terminal, a laptop terminal, or a desktop terminal.

Generally, the terminal 600 includes a processor 601 and a memory 602.

The processor 601 may include one or more processing cores, and may be, for example, a 4-core processor or an 8-core processor. The processor 601 may be implemented by using at least one hardware form of a digital signal processor (DSP), a field-programmable gate array (FPGA), and a programmable logic array (PLA). The processor 601 may also include a main processor and a coprocessor. The main processor is configured to process data in a wake-up state, which is also referred to as a central processing unit (CPU). The coprocessor is configured to process data in a standby state with low power consumption. In some embodiments, the processor 601 may be integrated with a graphics processing unit (GPU). The GPU is configured to render and draw content that needs to be displayed on a display screen. In some embodiments, the processor 601 may further include an artificial intelligence (AI) processor. The AI processor is configured to process a computing operation related to machine learning.

The memory 602 may include one or more computer-readable storage media. The computer-readable storage medium may be non-transient. The memory 602 may further include a high-speed RAM, and a non-volatile memory such as one or more magnetic disk storage devices and a flash memory device. In some embodiments, the non-transitory computer-readable storage medium in the memory 602 is configured to store at least one instruction, the at least one instruction being configured to be executed by the processor 601 to implement the perspective rotation method provided in the method embodiments of this application.

In some embodiments, the terminal 600 may alternatively include: a peripheral interface 603 and at least one peripheral. The processor 601, the memory 602, and the peripheral interface 603 may be connected through a bus or a signal cable. Each peripheral may be connected to the peripheral interface 603 through a bus, a signal cable, or a circuit board. Specifically, the peripheral includes: at least one of a radio frequency (RF) circuit 604, a display screen 605, a camera component 606, an audio circuit 607, a positioning component 608, and a power supply 609.

The peripheral interface 603 may be configured to connect the at least one peripheral related to input/output (I/O) to the processor 601 and the memory 602. In some embodiments, the processor 601, the memory 602, and the peripheral interface 603 are integrated on the same chip or circuit board. In some other embodiments, any one or two of the processors 601, the memory 602, and the peripheral interface 603 may be implemented on a separate chip or circuit board. This is not limited in this embodiment.

The RF circuit 604 is configured to receive and transmit an RF signal, also referred to as an electromagnetic signal. The RF circuit 604 communicates with a communication network and other communication devices by using the electromagnetic signal. The RF circuit 604 converts an electric signal into an electromagnetic signal for transmission, or converts a received electromagnetic signal into an electric signal. In some embodiments, the RF circuit 604 includes: an antenna system, an RF transceiver, one or more amplifiers, a tuner, an oscillator, a digital signal processor, a codec chip set, a subscriber identity module card, and the like. The RF circuit 604 may communicate with another terminal by using at least one wireless communications protocol. The wireless communication protocol includes, but is not limited to: a world wide web, a metropolitan area network, an intranet, generations of mobile communication networks (2G, 3G, 4G, and 5G), a wireless local area network and/or a wireless fidelity (Wi-Fi) network. In some embodiments, the RF circuit 604 may further include a circuit related to near field communication (NFC). This is not limited in this application.

The display screen 605 is configured to display a UI. The UI may include a graph, a text, an icon, a video, and any combination thereof. When the display screen 605 is a touch display screen, the display screen 605 is also capable of collecting a touch signal on or above a surface of the display screen 605. The touch signal may be inputted into the processor 601 as a control signal for processing. In this case, the display screen 605 may be further configured to provide a virtual button and/or a virtual keyboard, also referred to as a soft button and/or a soft keyboard. In some embodiments, there may be one display screen 605, disposed on a front panel of the terminal 600. In some other embodiments, there may be at least two display screens 605, respectively disposed on different surfaces of the terminal 600 or designed in a foldable shape. In still some other embodiments, the display screen 605 may be a flexible display screen, disposed on a curved surface or a folded surface of the terminal 600. The display screen 605 may further be set to have a non-rectangular irregular graph, that is, a special-shaped screen. The display screen 605 may be manufactured by using a material such as a liquid crystal display (LCD), an organic light-emitting diode (OLED), or the like.

The camera component 606 is configured to capture images or videos. In some embodiments, the camera component 606 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, each being any one of a main camera, a depth-of-field camera, a wide-angle camera, and a telephoto camera, so as to implement a background blurring function by fusing the main camera with the depth-of-field camera, and implement panoramic shooting and virtual reality (VR) shooting functions or other fusing shooting functions by fusing the main camera with the wide-angle camera. In some embodiments, the camera component 606 may further include a flash. The flash may be a single color temperature flash or a double color temperature flash. The double color temperature flash refers to a combination of a warm flash and a cold flash, and may be configured to perform light ray compensation at different color temperatures.

The audio circuit 607 may include a microphone and a speaker. The microphone is configured to collect sound waves of users and surroundings, and convert the sound waves into electrical signals and input the signals to the processor 601 for processing, or input the signals to the radio frequency circuit 604 to implement voice communication. For stereo collection or noise reduction, there may be a plurality of microphones, disposed at different portions of the terminal 600 respectively. The microphone may be further an array microphone or an omni-directional collection type microphone. The speaker is configured to convert electric signals from the processor 601 or the RF circuit 604 into sound waves. The speaker may be a conventional thin-film speaker or a piezoelectric ceramic speaker. When the speaker is the piezoelectric ceramic speaker, electrical signals not only can be converted into sound waves that can be heard by human, but also can be converted into sound waves that cannot be heard by human for ranging and the like. In some embodiments, the audio circuit 607 may further include an earphone jack.

The positioning component 608 is configured to determine a current geographic location of the terminal 600 for implementing navigation or a location-based service (LBS). The positioning component 608 may be a positioning component based on the global positioning system (GPS) of the United States, the BeiDou System of China, and the GALILEO System of Russia.

The power supply 609 is configured to supply power to components in the terminal 600. The power supply 609 may be an alternating current, a direct current, a primary battery, or a rechargeable battery. In a case that the power supply 609 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a quick charge technology.

In some embodiments, the terminal 600 may also include one or more sensors 610. The one or more sensors 610 include, but are not limited to, an acceleration sensor 611, a gyroscope sensor 612, a pressure sensor 613, a fingerprint sensor 614, an optical sensor 615, and a proximity sensor 616.

The acceleration sensor 611 may detect a magnitude of acceleration on three coordinate axes of a coordinate system established with the terminal 600. For example, the acceleration sensor 611 may be configured to detect components of gravity acceleration on the three coordinate axes. The processor 601 may control, according to a gravity acceleration signal collected by the acceleration sensor 611, the display screen 605 to display the UI in a frame view or a portrait view. The acceleration sensor 611 may be further configured to collect motion data of a game or a user.

The gyroscope sensor 612 may detect a body direction and a rotation angle of the terminal 600. The gyroscope sensor 612 may cooperate with the acceleration sensor 611 to collect a 3D action by the user on the terminal 600. The processor 601 may implement the following functions according to the data collected by the gyroscope sensor 612: motion sensing (such as changing the UI according to a tilt operation of the user), image stabilization at shooting, game control, and inertial navigation.

The pressure sensor 613 may be disposed at a side frame of the terminal 600 and/or a lower layer of the display screen 605. When the pressure sensor 613 is disposed at the side frame of the terminal 600, a holding signal of the user on the terminal 600 may be detected. The processor 601 performs left and right hand recognition or a quick operation according to the holding signal collected by the pressure sensor 613. When the pressure sensor 613 is disposed on the low layer of the touch display screen 605, the processor 601 controls, according to a pressure operation of the user on the display screen 605, an operable control on the UI. The operable control includes at least one of a button control, a scroll bar control, an icon control, and a menu control.

The fingerprint sensor 614 is configured to collect a fingerprint of a user, and the processor 601 recognizes an identity of the user according to the fingerprint collected by the fingerprint sensor 614, or the fingerprint sensor 614 recognizes the identity of the user based on the collected fingerprint. When the identity of the user is identified as a trusted identity, the processor 601 authorizes the user to perform a related sensitive operation. The sensitive operation includes unlocking a screen, viewing encrypted information, downloading software, payment, changing settings, and the like. The fingerprint sensor 614 may be disposed on a front face, a back face, or a side face of the terminal 600. When a physical button or a vendor logo is disposed on the terminal 600, the fingerprint sensor 614 may be integrated together with the physical button or the vendor logo.

The optical sensor 615 is configured to collect ambient light intensity. In an embodiment, the processor 601 may control display brightness of the display screen 605 according to the ambient light intensity collected by the optical sensor 615. Specifically, when the ambient light intensity is relatively high, the display luminance of the display screen 605 is increased. When the ambient light intensity is relatively low, the display luminance of the display screen 605 is reduced. In another embodiment, the processor 601 may further dynamically adjust a camera parameter of the camera component 606 according to the ambient light intensity collected by the optical sensor 615.

The proximity sensor 616, also referred to as a distance sensor, is generally disposed on the front panel of the terminal 600. The proximity sensor 616 is configured to collect a distance between the user and the front surface of the terminal 600. In an embodiment, when the proximity sensor 616 detects that the distance between the user and the front surface of the terminal 600 gradually becomes smaller, the display screen 605 is controlled by the processor 601 to switch from a screen-on state to a screen-off state. In a case that the proximity sensor 616 detects that the distance between the user and the front surface of the terminal 600 gradually becomes larger, the display screen 605 is controlled by the processor 601 to switch from the screen-off state to the screen-on state.

A person skilled in the art may understand that the structure shown in FIG. 19 constitutes no limitation on the terminal 600, and the terminal may include more or fewer components than those shown in the figure, or some components may be combined, or a different component deployment may be used.

A person of ordinary skill in the art may understand that all or a part of the steps of the methods in the embodiments may be implemented by a program instructing relevant hardware. The program may be stored in a computer-readable storage medium. The computer-readable storage medium may be the computer-readable storage medium included in the memory in the foregoing embodiment, or may be a computer-readable storage medium that exists independently and that is not assembled in a terminal. The computer-readable storage medium stores at least one instruction, at least one program, a code set or an instruction set, the at least one instruction, the at least one program, the code set or the instruction set being loaded and executed by the processor to implement the perspective rotation method in any one of FIG. 4 to FIG. 16.

In some embodiments, the computer-readable storage medium may include: a ROM, a RAM, a solid state drive (SSD), an optical disc, or the like. The RAM may include a resistance random access memory (ReRAM) and a dynamic random access memory (DRAM). The sequence numbers of the foregoing embodiments of this application are merely for description purpose, and are not intended to indicate priorities of the embodiments.

A person of ordinary skill in the art may understand that all or some of the steps of the embodiments may be implemented by hardware, or may be implemented by a program instructing related hardware. The program may be stored in a computer-readable storage medium. The storage medium mentioned above may include: a ROM, a magnetic disk, or an optical disc.

The foregoing descriptions are merely illustrative embodiments of this application, but are not intended to limit this application. Any modification, equivalent replacement, or improvement made within the spirit and principle of this application shall fall within the protection scope of this application.

What is claimed is:

1. A perspective rotation method in a virtual environment associated with a virtual player of an application performed by a terminal, the method comprising:

displaying a first perspective picture of the application observed in a first observation direction of the virtual player's perspective in the virtual environment;

receiving a perspective rotation operation by a user of the terminal;

determining a range within which a speed of the perspective rotation operation falls, further including:

determining (i) a movement distance of the perspective rotation operation and (ii) a movement speed of the perspective rotation operation;

determining a first acceleration parameter associated with a predefined movement distance range including the movement distance of the perspective rotation operation;

determining a second acceleration parameter associated with a predefined movement speed range including the movement speed of the perspective rotation operation; and determining an angular velocity of the virtual player's perspective as a function of an initial angular velocity and the first acceleration parameter and the second acceleration parameter; and rotating from the first perspective picture to a third perspective picture observed in a third observation direction of the virtual player in the virtual environment according to the angular velocity of the virtual player's perspective.

2. The method according to claim 1, wherein the first observation direction refers to a direction of a camera orientation of a virtual camera in the virtual environment; and the rotating from the first perspective picture to a third perspective picture comprises:

rotating the virtual camera from the first observation direction to the third observation direction according to the angular velocity of the virtual player's perspective by using the virtual camera as a rotation center; and displaying the third perspective picture corresponding to the third perspective in the third observation direction.

3. The method according to claim 1, wherein the determining an angular velocity of the virtual player's perspective as a function of an initial angular velocity and the first acceleration parameter and the second acceleration parameter comprises:

determining that the movement distance of the perspective rotation operation belongs to an $j^{th}$ distance range threshold in M distance range thresholds and the movement speed of the perspective rotation operation belongs to an $i^{th}$ range speed threshold in N speed range thresholds, the $j^{th}$ distance range threshold and $i^{th}$ speed range threshold corresponding to an ($j^{th}$, $i^{th}$) angular velocity; and determining the ($j^{th}$, $i^{th}$) angular velocity as the angular velocity.

4. The method according to claim 1, wherein the first perspective picture is further provided with a setting button control, and the method further comprises:

receiving a trigger operation on the setting button control by the user of the terminal;

displaying a setting interface of the application according to the trigger operation, the setting interface comprising a setting option of the perspective rotation operation; and setting the perspective rotation accelerating condition by using the setting option.

5. A terminal, comprising a processor and a memory, the memory storing computer-readable instructions that, when executed by the processor of the terminal, cause the terminal to perform a perspective rotation method in a virtual environment associated with a virtual player of an application including:

displaying a first perspective picture of the application observed in a first observation direction of the virtual player's perspective in the virtual environment;

receiving a perspective rotation operation by a user of the terminal;

determining a range within which a speed of the perspective rotation operation falls, further including:

determining (i) a movement distance of the perspective rotation operation and (ii) a movement speed of the perspective rotation operation;

determining a first acceleration parameter associated with a predefined movement distance range including the movement distance of the perspective rotation operation;

determining a second acceleration parameter associated with a predefined movement speed range including the movement speed of the perspective rotation operation; and determining an angular velocity of the virtual player's perspective as a function of an initial angular velocity and the first acceleration parameter and the second acceleration parameter; and rotating from the first perspective picture to a third perspective picture observed in a third observation direction of the virtual player in the virtual environment according to the angular velocity of the virtual player's perspective.

6. The terminal according to claim 5, wherein the first observation direction refers to a direction of a camera orientation of a virtual camera in the virtual environment; and the rotating from the first perspective picture to a third perspective picture comprises:

rotating the virtual camera from the first observation direction to the third observation direction according to the angular velocity of the virtual player's perspective by using the virtual camera as a rotation center; and displaying the third perspective picture corresponding to the third perspective in the third observation direction.

7. The terminal according to claim 5, wherein the determining an angular velocity of the virtual player's perspective as a function of an initial angular velocity and the first acceleration parameter and the second acceleration parameter comprises:

determining that the movement distance of the perspective rotation operation belongs to an $j^{th}$ distance range threshold in M distance range thresholds and the movement speed of the perspective rotation operation belongs to an $i^{th}$ range speed threshold in N speed range thresholds, the $j^{th}$ distance range threshold and $i^{th}$ speed range threshold corresponding to an ($j^{th}$, $i^{th}$) angular velocity; and determining the ($j^{th}$, $i^{th}$) angular velocity as the angular velocity.

8. The terminal according to claim 5, wherein the first perspective picture is further provided with a setting button control, and the method further comprises:

receiving a trigger operation on the setting button control by the user of the terminal;

displaying a setting interface of the application according
to the trigger operation, the setting interface comprising
a setting option of the perspective rotation operation;
and setting the perspective rotation accelerating condition by
using the setting option.

9. A non-transitory computer-readable storage medium
storing computer-readable instructions that, when executed
by a processor of a terminal, cause the terminal to perform
a perspective rotation method in a virtual environment
associated with a virtual player of an application including:

displaying a first perspective picture of the application
observed in a first observation direction of the virtual
player's perspective in the virtual environment;

receiving a perspective rotation operation by a user of the
terminal;

determining a range within which a speed of the perspec-
tive rotation operation falls, further including:

determining (i) a movement distance of the perspective
rotation operation and (ii) a movement speed of the
perspective rotation operation;

determining a first acceleration parameter associated
with a predefined movement distance range includ-
ing the movement distance of the perspective rota-
tion operation;

determining a second acceleration parameter associated
with a predefined movement speed range including
the movement speed of the perspective rotation
operation; and determining an angular velocity of the virtual player's
perspective as a function of an initial angular veloc-
ity and the first acceleration parameter and the sec-
ond acceleration parameter; and rotating from the first perspective picture to a third
perspective picture observed in a third observation
direction of the virtual player in the virtual environment
according to the angular velocity of the virtual player's
perspective.

10. The non-transitory computer-readable storage
medium according to claim 9, wherein the first observation direction refers to a direction of a camera orientation of a
virtual camera in the virtual environment; and the rotating from the first perspective picture to a third
perspective picture comprises:

rotating the virtual camera from the first observation
direction to the third observation direction according to
the angular velocity of the virtual player's perspective
by using the virtual camera as a rotation center; and displaying the third perspective picture corresponding to
the third perspective in the third observation direction.

11. The non-transitory computer-readable storage
medium according to claim 9, wherein the determining an
angular velocity of the virtual player's perspective as a
function of an initial angular velocity and the first accelera-
tion parameter and the second acceleration parameter com-
prises:

determining that the movement distance of the perspec-
tive rotation operation belongs to an $j^{th}$ distance range
threshold in M distance range thresholds and the move-
ment speed of the perspective rotation operation
belongs to an $i^{th}$ range speed threshold in N speed range
thresholds, the $j^{th}$ distance range threshold and $i^{th}$ speed
range threshold corresponding to an ($j^{th}$, $i^{th}$) angular
velocity; and determining the ($j^{th}$, $i^{th}$) angular velocity as the angular
velocity.

12. The non-transitory computer-readable storage
medium according to claim 9, wherein the first perspective
picture is further provided with a setting button control, and
the method further comprises:

receiving a trigger operation on the setting button control
by the user of the terminal;

displaying a setting interface of the application according
to the trigger operation, the setting interface comprising
a setting option of the perspective rotation operation;
and setting the perspective rotation accelerating condition by
using the setting option.

* * * * *